(12) United States Patent
Patterson et al.

(10) Patent No.: US 7,679,222 B2
(45) Date of Patent: Mar. 16, 2010

(54) POWER AND SIGNAL DISTRIBUTION SYSTEM FOR USE IN INTERIOR BUILDING SPACES

(75) Inventors: Brian T. Patterson, Lewisberry, PA (US); Sean D. Browne, Lancaster, PA (US); William E. Beakes, Columbia, PA (US); Sandor A. Frecska, Mannington, WV (US); Jere W. Myers, Washington Boro, PA (US)

(73) Assignee: Worthington Armstrong Venture, Malvern, PA (US)

( * ) Notice: Subject to any disclaimer, the term of this patent is extended or adjusted under 35 U.S.C. 154(b) by 0 days.

(21) Appl. No.: 11/536,356

(22) Filed: Sep. 28, 2006

(65) Prior Publication Data

US 2007/0103824 A1    May 10, 2007

Related U.S. Application Data

(60) Provisional application No. 60/721,381, filed on Sep. 28, 2005.

(51) Int. Cl.
| | |
|---|---|
| H01H 47/00 | (2006.01) |
| E04C 2/52 | (2006.01) |
| H02B 1/01 | (2006.01) |
| H02G 3/08 | (2006.01) |
| H02G 3/22 | (2006.01) |
| H02G 3/30 | (2006.01) |
| H01H 35/00 | (2006.01) |

(52) U.S. Cl. ............... 307/116; 307/125; 307/126; 307/130; 307/131; 52/220.6; 174/480; 174/481; 174/500; 174/503; 174/506

(58) Field of Classification Search ............... 307/116, 307/125, 126, 130, 131; 52/220.6; 174/41, 174/43, 70 R, 71 R, 72 R, 480, 481, 500, 174/503, 505, 506
See application file for complete search history.

(56) References Cited

U.S. PATENT DOCUMENTS

| | | | |
|---|---|---|---|
| 3,683,100 A | 8/1972 | Deal et al. | 174/48 |
| 3,706,913 A | 12/1972 | Malatchi | 315/292 |
| 3,918,224 A | 11/1975 | Sundequist | 52/221 |
| 4,001,571 A | 1/1977 | Martin | 240/9 R |
| 4,274,045 A | 6/1981 | Goldstein | 323/319 |
| 4,286,419 A | 9/1981 | Treffers | 52/39 |
| 4,434,388 A | 2/1984 | Carver et al. | 315/307 |
| RE33,220 E | 5/1990 | Collier | 52/263 |
| 5,072,216 A | 12/1991 | Grange | 340/825.52 |
| 5,096,429 A | 3/1992 | Fraser | 439/115 |
| 5,581,137 A | 12/1996 | Lundquist et al. | 310/68 R |
| 5,621,282 A | 4/1997 | Haskell | 315/324 |
| 5,640,061 A | 6/1997 | Bornhorst et al. | 307/150 |
| 5,668,446 A | 9/1997 | Baker | 315/294 |
| 5,769,527 A | 6/1998 | Taylor et al. | 362/85 |
| 5,962,989 A | 10/1999 | Baker | 315/294 |

(Continued)

*Primary Examiner*—Jared J Fureman
*Assistant Examiner*—Hal I Kaplan

(57) ABSTRACT

A power and signal distribution system for the building interior and a method for operating a power and signal distribution system for the building interior are provided. The system includes a plurality of conductors adjacent to at least one surface of a plurality of support members forming a grid. The system further includes at least one shunt switch in communication with at least two conductors, the shunt switch being configurable to selectively conduct power or signals between the at least two conductors.

17 Claims, 20 Drawing Sheets

U.S. PATENT DOCUMENTS

| | | | |
|---|---|---|---|
| 6,142,501 A | 11/2000 | Fogo et al. | 280/475 |
| 6,172,315 B1 | 1/2001 | Miller et al. | 200/61.73 |
| 6,198,228 B1 | 3/2001 | Nilssen | 315/185 R |
| 6,252,358 B1 | 6/2001 | Xydis et al. | 315/295 |
| 6,364,255 B1 * | 4/2002 | Carrick et al. | 248/49 |
| 6,515,437 B1 | 2/2003 | Zinkler et al. | 315/312 |
| 6,540,373 B2 | 4/2003 | Bailey | 362/150 |
| 6,570,269 B2 | 5/2003 | McMillan et al. | 307/64 |
| 6,684,582 B2 | 2/2004 | Peart et al. | 52/220.1 |
| 6,764,196 B2 | 7/2004 | Bailey | 362/147 |
| 6,812,594 B2 | 11/2004 | Face et al. | 307/119 |
| 6,827,592 B2 | 12/2004 | McCoy et al. | 439/188 |
| 6,871,983 B2 | 3/2005 | Jacob et al. | 362/364 |
| 6,965,205 B2 | 11/2005 | Piepgras et al. | 315/318 |
| 6,979,787 B2 | 12/2005 | Davies | 200/51 R |
| 7,034,470 B2 | 4/2006 | Cok et al. | 315/249 |
| 7,050,794 B2 | 5/2006 | Chuey | 455/418 |
| 7,108,392 B2 | 9/2006 | Strip et al. | 362/145 |
| 7,132,804 B2 | 11/2006 | Lys et al. | 315/292 |
| 7,281,355 B2 * | 10/2007 | Cole | 52/220.6 |
| 2004/0246638 A1 | 12/2004 | Davies | 361/42 |
| 2005/0026602 A1 | 2/2005 | Chuey et al. | 455/418 |
| 2005/0243491 A1 | 11/2005 | Tanis | 361/104 |
| 2006/0126647 A1 | 6/2006 | Hicks | 370/401 |

* cited by examiner

| Junction Response | J1 – U | J1 – L | J2 – U | J2 – U | J3 – U | J3 - L |
|---|---|---|---|---|---|---|
| X Volts | CLOSED | OPEN | CLOSED | OPEN | CLOSED | OPEN |
| Y Volts | OPEN | CLOSED | OPEN | CLOSED | OPEN | CLOSED |
| Z Volts | CLOSED | CLOSED | CLOSED | CLOSED | CLOSED | CLOSED |

| Voltage Input | Status L1 | Status L2 | Status L3 | Status L4 | Status L5 | Status L6 |
|---|---|---|---|---|---|---|
| X Volts | ON | ON | ON | OFF | OFF | OFF |
| Y Volts | OFF | OFF | OFF | ON | ON | ON |
| Z Volts | ON | ON | ON | ON | ON | ON |

POWER AND SIGNAL DISTRIBUTION SYSTEM FOR USE IN INTERIOR BUILDING SPACES

FIELD OF THE INVENTION

The present invention is directed to a self-configuring power mesh and in particular, to a grid system which utilizes the concept of a self-configuring power mesh to distribute power and signaling in the interior of a building.

BACKGROUND OF THE INVENTION

The electrical grid connecting America's power plants, transmission lines and substations to homes, businesses, and factories operates almost entirely within the realm of high voltage alternating current (AC). Yet an increasing fraction of devices found in those buildings actually operate on low voltage direct current (DC). These devices include, but are not limited to, digital displays, remote controls, touch-sensitive controls, transmitters, receivers, timers, light emitting diodes (LEDs), audio amplifiers, microprocessors, and virtually all products utilizing rechargeable batteries. A challenge of the primary power distribution infrastructure in modern commercial buildings is the need for conversion of power from high voltage, generally 110-230 volts AC, to low voltage, generally 3-24 volts DC.

Currently, conversions from high voltage to low voltage are accomplished via a device commonly referred to as an AC/DC "transformer" or "power adapter." The present practice in the low voltage device industry, which today primarily includes components from the solid-state electronics device industry, is to design device specific, i.e., dedicated, AC/DC transformers, since much is known about the specifics of a single device. It is estimated that there are more than 3.1 billion devices in use across the United States of America, which utilize an AC/DC transformer. A typical AC/DC transformer is illustrated in FIG. 1. The AC/DC transformer shown in FIG. 1 includes an AC input 10, a transformer 15, a rectifier 20, and a linear regulator 25 arranged to provide a DC output 30. The operation of the AC/DC transformer is well-known in the art.

It is widely known that such transformer/adapters vary significantly in efficiency. On average, about 50 to 60% of the power entering the high voltage AC input side of these transformers typically leaves as low voltage power on the DC output side. The remainder is consumed as waste heat. Therefore, improving the raw electricity consumption efficiency of conventional AC/DC transformers has the potential to dramatically reduce energy costs.

Load variation, or the amount of power actually needed at any given point in time versus any other point in time, is generally considered the most important factor in determining raw power consumption efficiency. Unfortunately, conventional low cost AC/DC transformers are designed to maximize their efficiency given a specific expected load or range of loads, thus producing efficiencies which are statistically highly variable.

A factor to be considered, when distributing power in the building interior, is the U.S. National Electrical Code (NEC) Class II and Class III power requirements for low voltage direct current (LVDC) circuits. In this regard, the NEC puts significant limitation on the total power available for devices attached to any one conductive segment as described therein. More specifically, Class II and Class III requirements restrict the connected load in an individual circuit to a maximum of 100 Volt-Amps. For example, in a circuit that is designed to operate nominally at 24 volts direct current (VDC), the connected current would be limited to approximately 4 amps (i.e., 100 Volt-Amps divided by 24 VDC=4.167 amps). In other words, loads exceeding 4 amps must be powered by at least two electrically isolated power sources, none of which individually exceeds 4 amps. Such load management, including real-time monitoring, is not sufficiently accommodated in current LVDC power distribution systems.

For the above reasons, there is a need to actively adjust the "grouping" of such potentially variant loads for the purposes of averaging the power load to be statistically less variable with respect to changing demand. Additionally, there is a need for a power management system in the building interior, including, but not limited to an individual ceiling environment, which can limit the amount of power distributed on any given "branch" of the grid network, such that the grid network complies with the full requirements of the NEC Class II or Class III.

SUMMARY OF THE INVENTION

The invention provides a power and signal distribution system for use in building interior spaces, such as the ceiling environment. The present system and method provides power efficiency optimization via load grouping and active power and signaling transmission routing, each of which can be managed on a real-time basis.

The system has a mesh-like structure, which includes a plurality of conductive elements which are mechanically connected. The system includes at least one shunt switch configured to either provide, deny or otherwise modify an electrical connection between two mechanically connected conductive elements. The shunt switch provides a configurable point for the system such that power, and any super-imposition of signals, can be passively or actively routed via a variety of conductive paths from one or more points of origin to one or more points of use.

One aspect of the present invention includes a power and signal distribution system for the building interior including a plurality of conductors adjacent to at least one surface of a plurality of support members forming a grid. In addition, at least one shunt switch interconnected with at least two conductors, the shunt switch being configurable to selectively conduct power or signals between at least two conductors.

Another aspect of the invention includes a method of configuring a power and signaling system. The method includes providing a plurality of conductive elements. The plurality of conductive elements are connected together, wherein the conductive elements remain electrically isolated from one another. At least one shunt switch is attached between at least two of the plurality of conductive elements to form a selective conductive path for the flow of electricity. Electricity is applied to one of the elements forming the conductive path. The electricity is routed via the conductive path and the shunt switch is configured to provide the desired functionality of the system.

The system according to an embodiment of the invention has the ability to reconfigure itself to utilize the load distribution capability of multiple paths at a single point of use, as well as utilize a single path at multiple points of use regardless of the distance between the respective points of use.

In addition, the system according to an embodiment of the invention has the potential to reduce the overall consumption of electrical energy and at the same time, preserve the mechanical functionality and general installation characteristics of the system.

The system according to an embodiment of the invention also allows for both local and/or central control of the active power grid functionality during all reasonable conditions of the building within which it is used. In addition to the passive, preset or so-called "default" capability of a grid that incorporates shunt switches, configurations include communication capable shunt switches that may be active, i.e., queried, monitored, addressed and/or manually or automatically controlled, either locally or remotely, are also included.

BRIEF DESCRIPTION OF THE DRAWINGS

Wherever possible, the same reference numbers are used throughout the drawings to refer to the same or like parts.

DETAILED DESCRIPTION OF THE INVENTION

Figure 1:
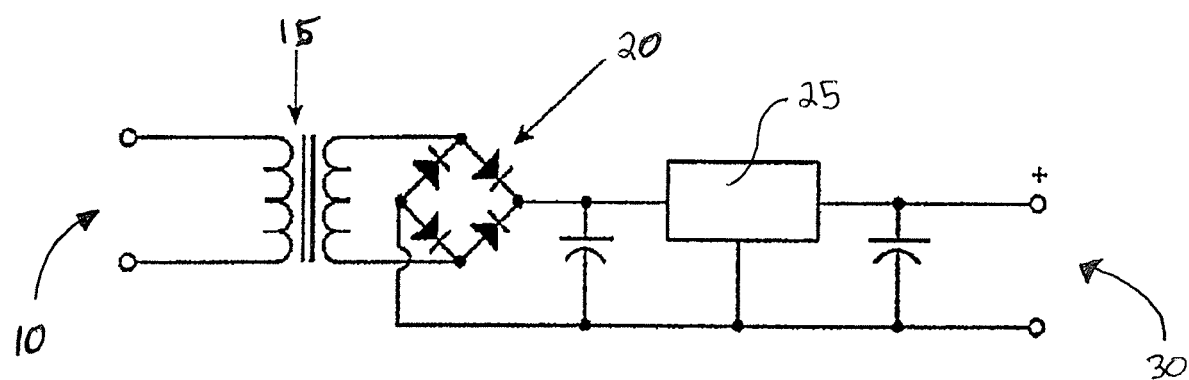
FIG. 1 illustrates a conventional AC/DC transformer.
Figure 2:
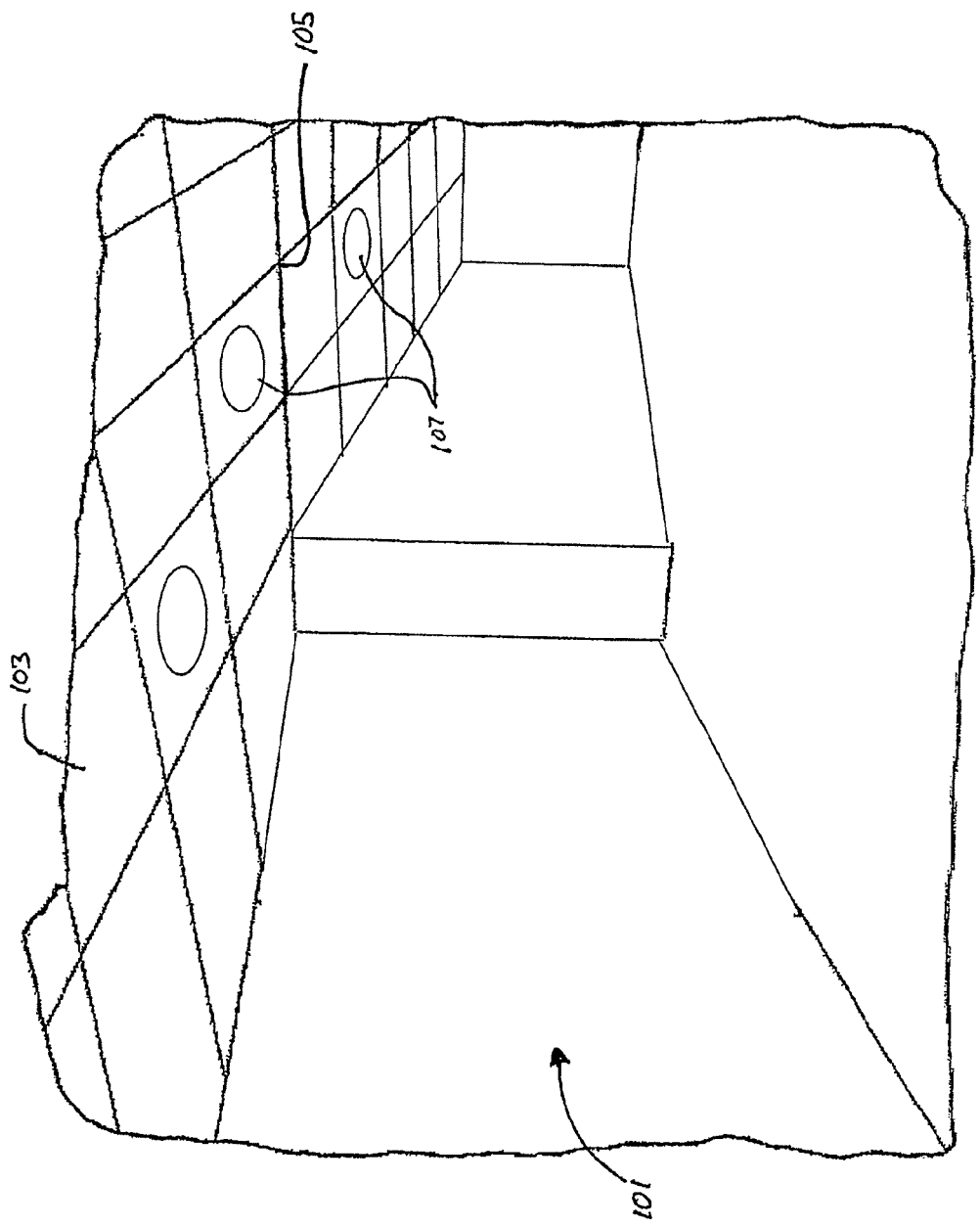
FIG. 2 shows an elevational perspective view of a room space having an electrified ceiling system according to an embodiment of the present invention.

The present invention includes a system for distributing power and or signals within an electrified ceiling framework system. In particular, the present invention includes a framework, preferably mounted onto the structural overhead of a room space 101, that is capable of providing power to low voltage electrical devices 107. FIG. 2 shows a room space 101 having a ceiling 103 supported by a ceiling grid framework 105. The framework 105 is arranged to allow connections of conductive elements on or within the framework 105 to provide selective power distribution and/or selective signal distribution. For example, power for the electrical devices 107 is provided by conductive elements or conductors 201 (see FIG. 3) placed upon surfaces of the ceiling grid framework 105. The ceiling 103 may include decorative tiles, acoustical tiles, insulative tiles, lights, heating ventilation and air conditioning (HVAC) vents, other ceiling elements or covers and combinations thereof. Electrical devices 107 are preferably low voltage devices including, but are not limited to, decorative devices, lighting devices, such as incandescent lights, fluorescent lights, light emitting diode (LED) lights, organic light emitting diode (OLED) lights, polymer light emitting diodes, electroluminescent lights, acoustical devices, such as speakers and other sound emitting, masking or cancelling devices, heating or cooling devices, such as electrically actuated mechanical devices (i.e., variable air velocity diffusors and other radiant or convection heating and/or cooling devices), sensor and/or control devices, such as smoke or carbon monoxide detectors, other air quality sensing devices, electronic motion detectors, wireless access points or antenna, communication devices, life safety and health maintenance devices, audio-visual devices, such as still or video cameras, electronic display or image producing devices and/or other electrical or electronic low voltage devices. These electrical devices 107 may be mounted within, above or below ceiling 103 and are connected to the system in a manner that provides the desired power and/or signal distribution.

While FIG. 2 shows grid framework 105 for use with a ceiling 103, the invention is not so limited and may include supporting a wall or other similar building interior structure or surface. In the instance where the grid framework 105 is part of a suspended ceiling 103, the grid framework 105 lie in a substantially horizontal plane. The substantially horizontal plane is defined as the volume between the top and bottom surfaces of the grid framework 105. Ceiling 103 may include conventionally available components, such as ceiling tiles that may be placed directly onto the conductors 201. In a preferred embodiment, the ceiling 103 includes ceiling tiles fabricated from a non-conductive material and may be placed directly onto the conductors 201.

Figure 3:
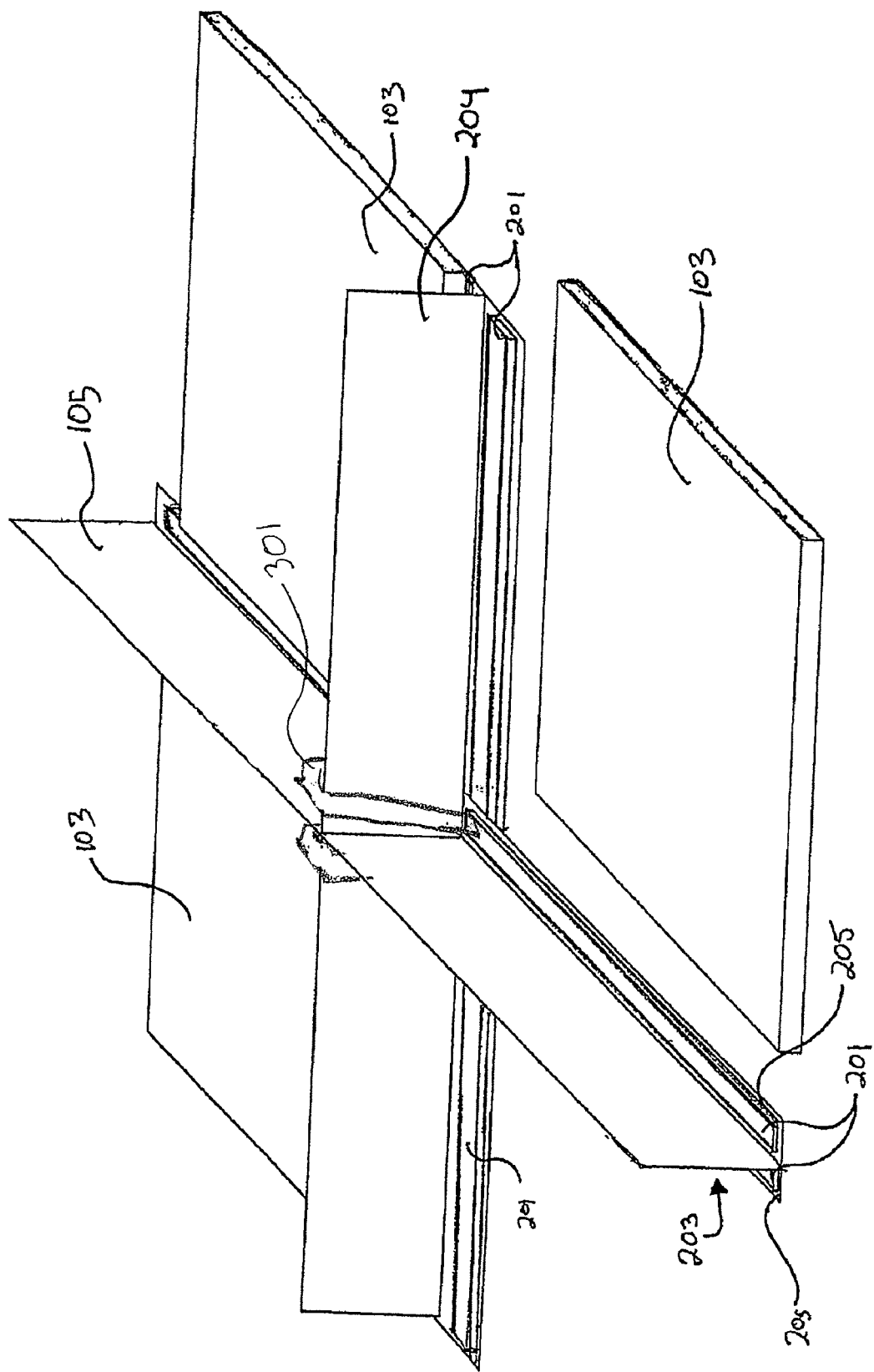
FIG. 3 shows a perspective view of a section of grid framework according to an embodiment of the present invention.
Figure 4:
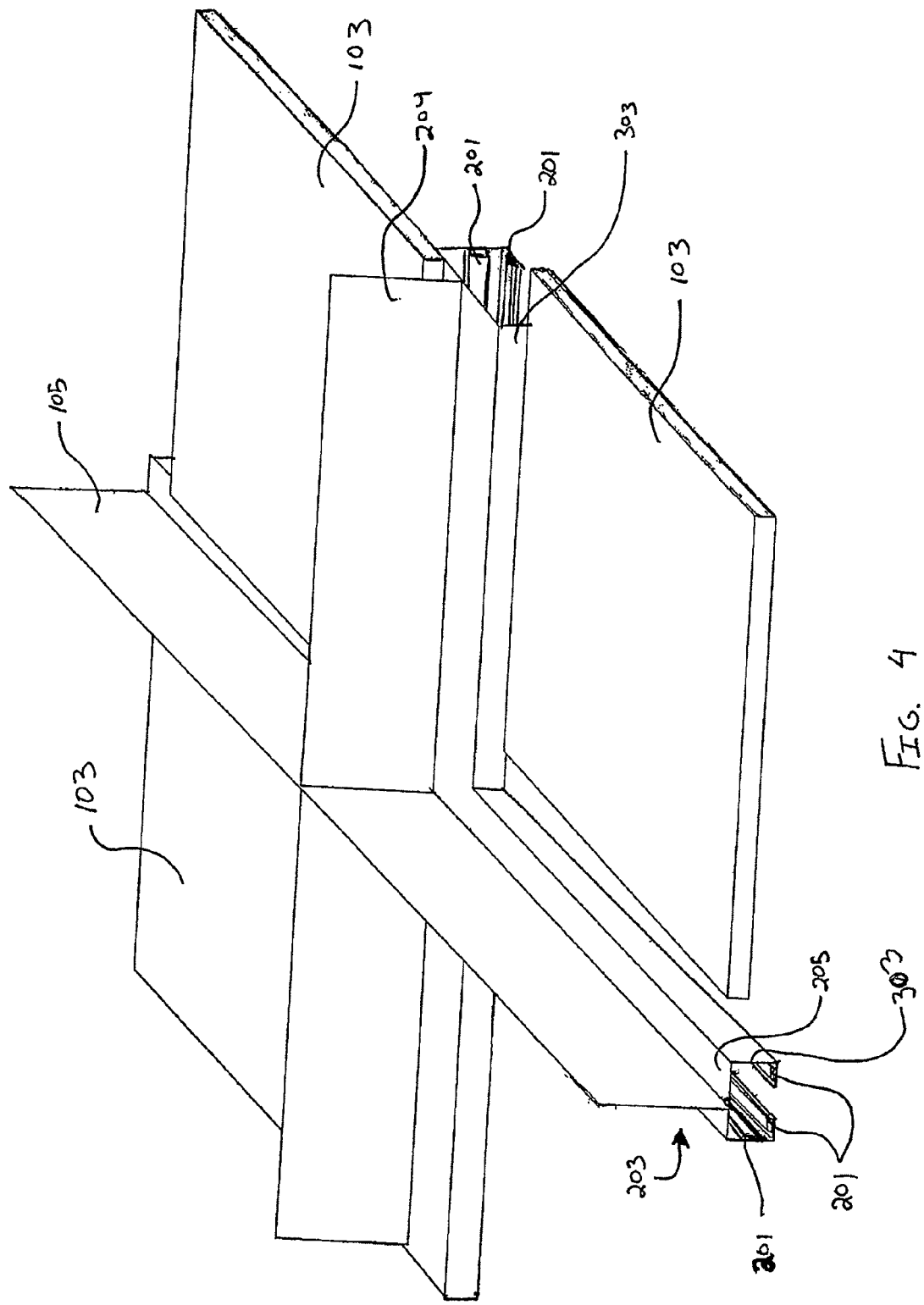
FIG. 4 shows a perspective view of a section of grid framework according to another embodiment of the present invention.

FIGS. 3 and 4 include perspective views of grid framework 105 systems according to alternate embodiments of the present invention. In particular, FIG. 3 shows a perspective view of a segment of the grid framework 105 viewed from above with a portion of the ceiling 103 removed. The grid framework 105 includes intersecting support members 203 having a cross-section having a substantially inverted "T" geometry, wherein flanges 205 extend outward from webbing 204. Webbing 204 extends from a bulb (not shown in FIG. 2) or other supporting device to the flange 205. Although FIG. 3 shows an inverted "T" geometry, any geometry capable of either supporting ceiling 103 or providing a suitable ceiling decoration may be used. The support members 203 are mounted to the building structure by use of mechanical wires, fasteners or other suitable support device connected by webbing 204 to the building structure (not shown in FIG. 3).

The system of the present invention includes conductors 201 that are mounted onto the upper surface of flange 205. While the conductors 201 are shown mounted on the upper surface of flange 205, the conductors 201 may be mounted on any surfaces or within any cavities formed in or by the grid framework 105 that may be electrically connected to electrical devices 107, including but not limited to, the vertical surfaces of webbing 204 and the lower surfaces of flanges 205 opposite the upper surface of the flange 205 or the ends of flange 205. The conductors 201 comprise a conductive material that, when contacted, provides an electrical connection that is sufficient to power a low voltage electrical device 107. Suitable conductive materials include, but are not limited to, aluminum and its alloys, copper and its alloys, brass, phosphor bronze, beryllium copper, stainless steel, or other conductive material or combinations thereof. In addition, conductive materials may include a conductive body material having a plating including, but not limited to, copper, nickel, tin, lead, bismuth, silver, gold plating or other conductive material plating or combination thereof. As shown in FIG. 3, one of the flange surfaces receives a conductor 201 having a positive charge and a second flange surface receives a conductor 201 having a negative charge.

In an alternate embodiment of the invention, a single positively charged conductor 201 may be provided, wherein a circuit may be completed by a device in connection with ground or otherwise suitable electrical return path. In addition, the conductor 201 is designed to be uniquely accessible from above, below and within the horizontal plane of the grid. Discontinuities in the electrical connection may be provided at the mechanical connection points of the support member 203, thereby providing separation of the mechanical and electrical functions of the grid during installation. After the mechanical installation of the grid framework 105, a power supply can be attached to the conductors 201 and distribution of the power across the ceiling 103 system may be provided. The conductors 201 may be exposed or may be partially or fully coated by an insulative or protective covering. The conductors 201 may be mounted onto, formed on or otherwise included as part of the ceiling grid framework 105 by any suitable method including, but not limited to, adhesive, plating or mechanical connection means. In addition, the conductors 201 may be mounted or formed directly onto the surface of the ceiling grid framework 105 or may have insulating material, such as MYLAR®, between the conductors 201 and the ceiling grid framework 105. MYLAR® is a federally registered trademark of E. I. Du Pont De Nemours and Company Corporation, Wilmington, Del., having a polyester composition that is well known in the art. Shunt switches 301 at the intersection of the support members 203 at the discontinuities include connectors and/or devices that provide selective connections between the conductors 201 of adjacent support members 203. The shunt switches 301 may include microprocessors, diodes, transistors, rectifiers, resistors, thermistors, capacitors, analog and/or digital logic circuits, sensing circuits, addressable ID circuits, jumpers, insulators, solid state or electromechanical relays, connectors and/or contacts, and/or any other electrical or electronic circuitry and components as may be appropriate to accomplish the intended functionality of the shunt switches 301.

In another embodiment of the invention, the conductors 201 may be at least partially coated with a material capable of resisting or slowing the effects of corrosion and dirt or dust. In another embodiment of the invention, the conductor 201 may be embedded into the support member 203. In order to facilitate electrical contact, the coating material of this embodiment of the invention may be electrically conductive or may be pierceable to facilitate contact with the conductor 201 or may be pierceable or partially or fully removable by another suitable means.

FIG. 4 shows a perspective view of a segment of the ceiling grid framework 105 viewed from above with a portion of the ceiling 103 having the arrangement shown in FIG. 3. However, the ceiling grid framework 105 of FIG. 4 includes intersecting support members 203 having an alternate geometry. In FIG. 4, the webbing 204 extends from a bulb (not shown in FIG. 4) or other support member to a lower box 303. The geometry of lower box 303 is not limited to the geometry shown and may be any geometry useful for supporting ceiling 103 or providing a suitable ceiling decoration and for providing a means into or onto which conductors 201 may be placed. The lower box 303 includes a plurality of conductors 201 arranged and disposed on surfaces within the lower box 303. The conductors 201 are not limited to the configuration shown in FIG. 4 and may be located on any surface of support member 203 or within any cavities formed in or by the grid framework 105. The arrangement of conductors 201 in FIG. 4 permits connections to electrical devices 107 (FIG. 2) below the ceiling grid framework 105. In addition, in the embodiment shown in FIG. 4, one or more shunt switches 301 are present within lower box 303 (not visible in FIG. 4) at the intersection of support members 203.

Figure 5:
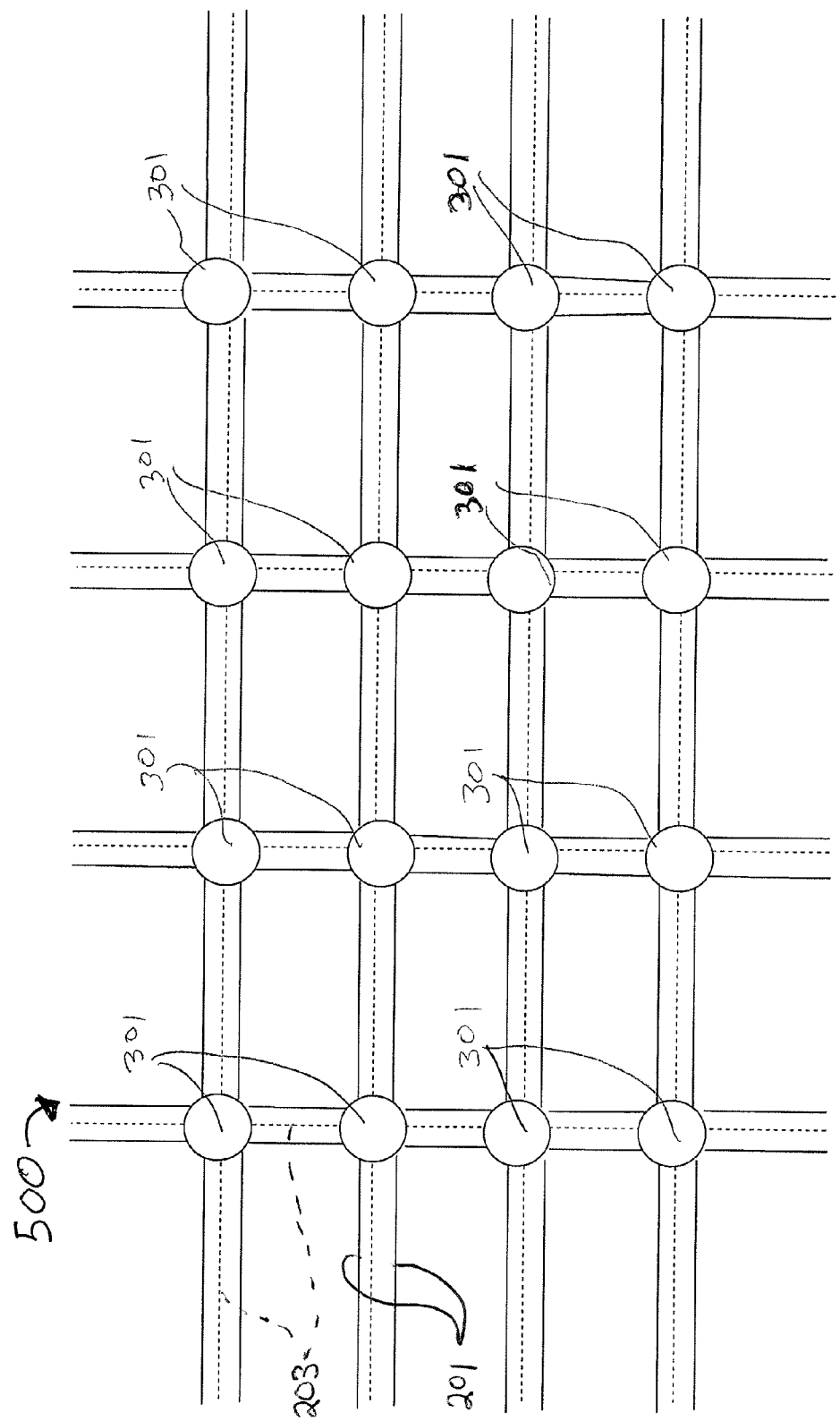
FIG. 5 shows a schematic view of an electrified ceiling system according to an embodiment of the invention.

FIG. 5 is a schematic diagram illustrative of a ceiling plan having a power and signal distribution mesh, which utilizes shunt switches 301 to physically connect the conductive elements to one another. Shunt switches 301 are preferably installed at junctions in the grid 500 in which the designer wishes to make, prevent or otherwise modify an electrical connection. Each shunt switch 301 is in physical contact with at least two of the conductors 201. The shunt switch 301 provides a design configurable point in the grid 500. The shunt switch 301, when closed, electrically links the conductors 201 to form a conductive path. Alternatively, the configurable shunt switch 301 may selectively disconnect the conductors 201 or permanently disconnect conductors 201.

The installation of these shunt switches 301 may be accomplished by an electrician or other person appropriately trained and/or skilled in the electrical trade. However, it is intended that the mechanical portion of the power and signaling distribution system need not be installed by one skilled in the electrical trade.

In addition to providing electrical connections, or non-connections, at junctions in the grid 500, the shunt switches 301 may also contain power sensing circuitry. This circuitry may sense voltage and/or current (amperage) conditions on either side of the shunt switch 301 connection. In addition, the shunt switch 301 may contain signal receiving and/or transmitting circuitry and signal processing circuitry. Such circuitry may be used to send and receive signals via the conductive path formed in the grid itself or may do so wirelessly using electromagnetic energy, such as RF transmission technology. Moreover, the shunt switch 301 may use electrical information received or sensed at the position of its connection, along with either a preset or real-time programmed logical instruction set to determine what "condition" an addressable shunt should be set to, namely "open" or "closed."

Addressable shunt switches 301 may be electronically configurable to have a default condition to which they will automatically be set, for example, in cases of primary power failure. Non-addressable, or passive, shunt switches 301 are configured to remain in their originally installed condition, i.e., open or closed, regardless of the power conditions in the grid 500.

Based on local code or ordinance, operational and cost factors, a system designer may select the types of shunt switches 301 and where to position them in the ceiling plan. Table 1 lists a representative sample of shunt switch 301 types.

TABLE 1

| Shunt Switch Type | Basic Capability | Default Condition | Operational Functionality* |
|---|---|---|---|
| Fixed Jumper | Passive | Closed | None |
| Fixed Insulator | Passive | Open | None |
| Universal Connector | Passive | Pre-settable | None |
| Dumb Switch | Active | Pre-settable | S, C |
| Dumb Reporter | Active | Pre-settable | S, C, Tx |
| Smart Switch | Active | Pre-settable | S, C, Rx |
| Smart Reporter | Active | Pre-settable | S, C, Rx/Tx |
| Intelligent Switch | Active | Pre-settable | S, C, A, Tx/Rx |

*Operational Functionality includes the following:
S = Power Sensing (such as current or voltage)
C = Configurable (such as Open or Closed)
Tx = Transmission Capable
Rx = Receive Capable
A = Addressable (for local, central or remote control)

The shunt switches 301 may also include other functionality or combinations of functionality not represented in TABLE 1.

FIGS. 6-18 illustrate arrangements for shunt switches 301 usable in the grid 500, as shown and described above with respect to FIG. 5. While two or more conductors 201 may be included on support member 203, FIGS. 6-18 illustrate only a single conductor 201 in junction 601 for simplicity of viewing. A second conductor 201, such as a conductor having a negative polarity, although not shown, may be utilized as any suitable circuitry that provides the desired functionality to the grid 500 and may include, but is not limited to, a fixed jumper across the shunt switch 301, a fixed insulator with self grounding component, or any other combination of components, including those components illustrated in any of FIGS. 6-18.

Figure 6:
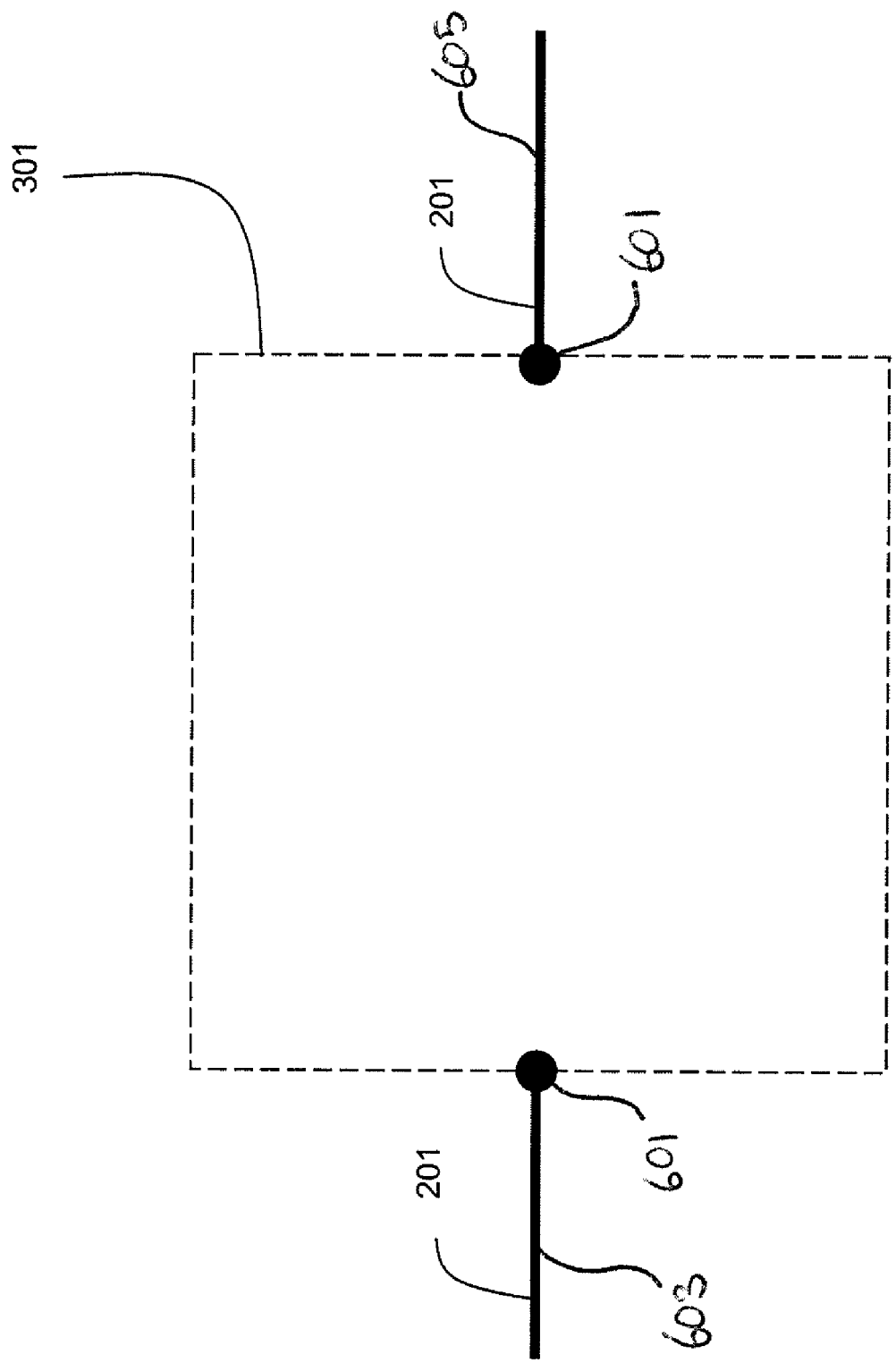
FIGS. 6-18 illustrate alternate shunt switch arrangements for use with the electrified ceiling system according to an embodiment of the invention.

FIG. 6 illustrates a fixed insulator shunt switch 301 according to an embodiment of the present invention. As discussed above with respect to FIG. 5, conductors 201 forming grid 500 connect to shunt switch 301 at junctions 601. The shunt switch 301 having the fixed insulator functionality shown in FIG. 6 includes no circuitry connecting the first conductor 603 with second conductor 605. In another embodiment the conductors 201 may have an insulative material interdisposed between the conductors 201.

Figure 7:
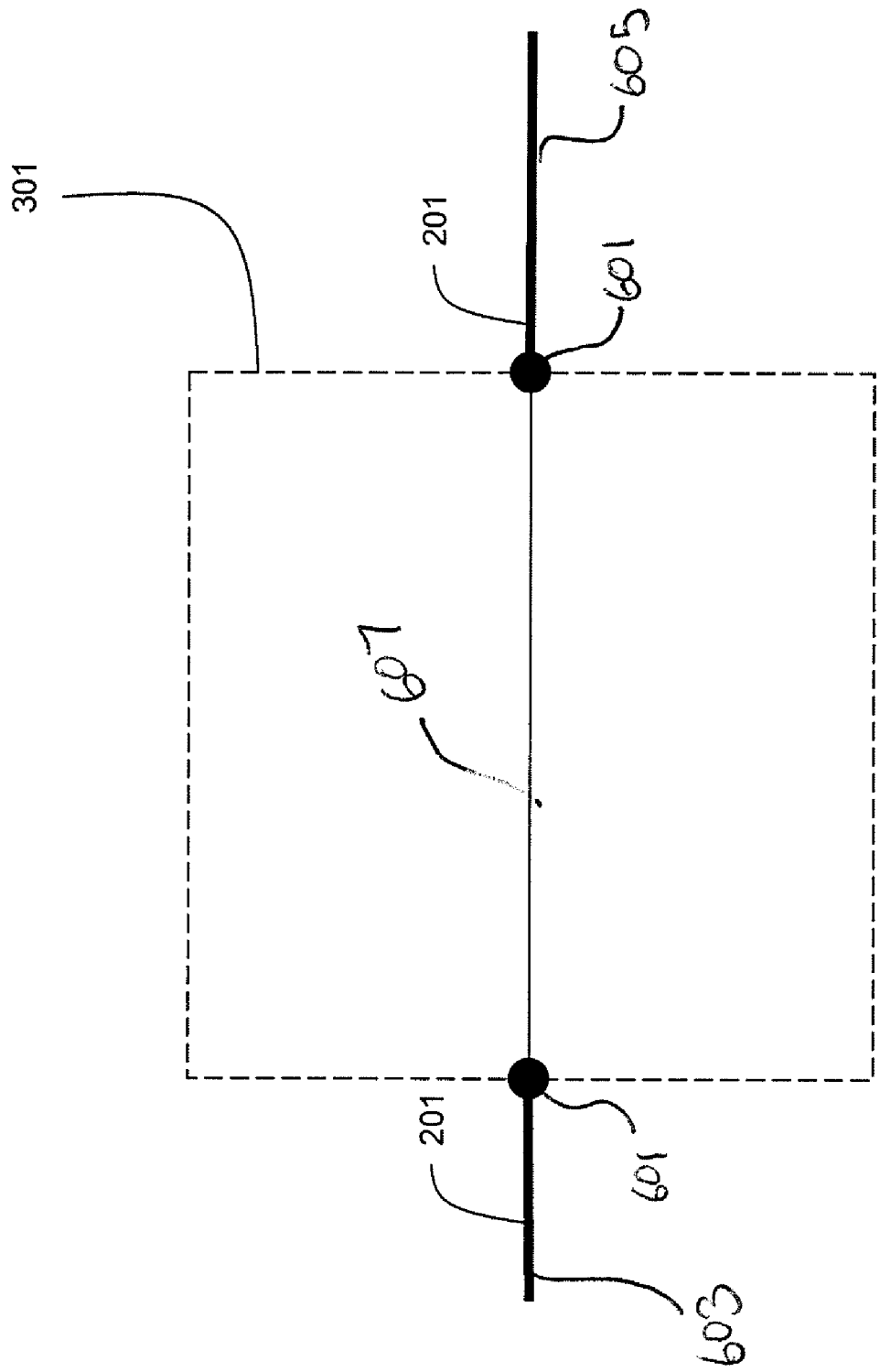

FIG. 7 illustrates a fixed jumper shunt switch 301 according to an embodiment of the present invention. As discussed above with respect to FIG. 5, conductors 201 forming grid 500 connect to shunt switch 301 at junctions 601. The shunt switch 301 having the fixed jumper functionality shown in FIG. 7 includes a connection 607, such as a wire or other configuration of conductive material, providing electrical communication between first conductor 603 and second conductor 605. The fixed jumper may provide a permanent connection that closes the circuit between the first conductor 603 and the second conductor 605.

Figure 8:
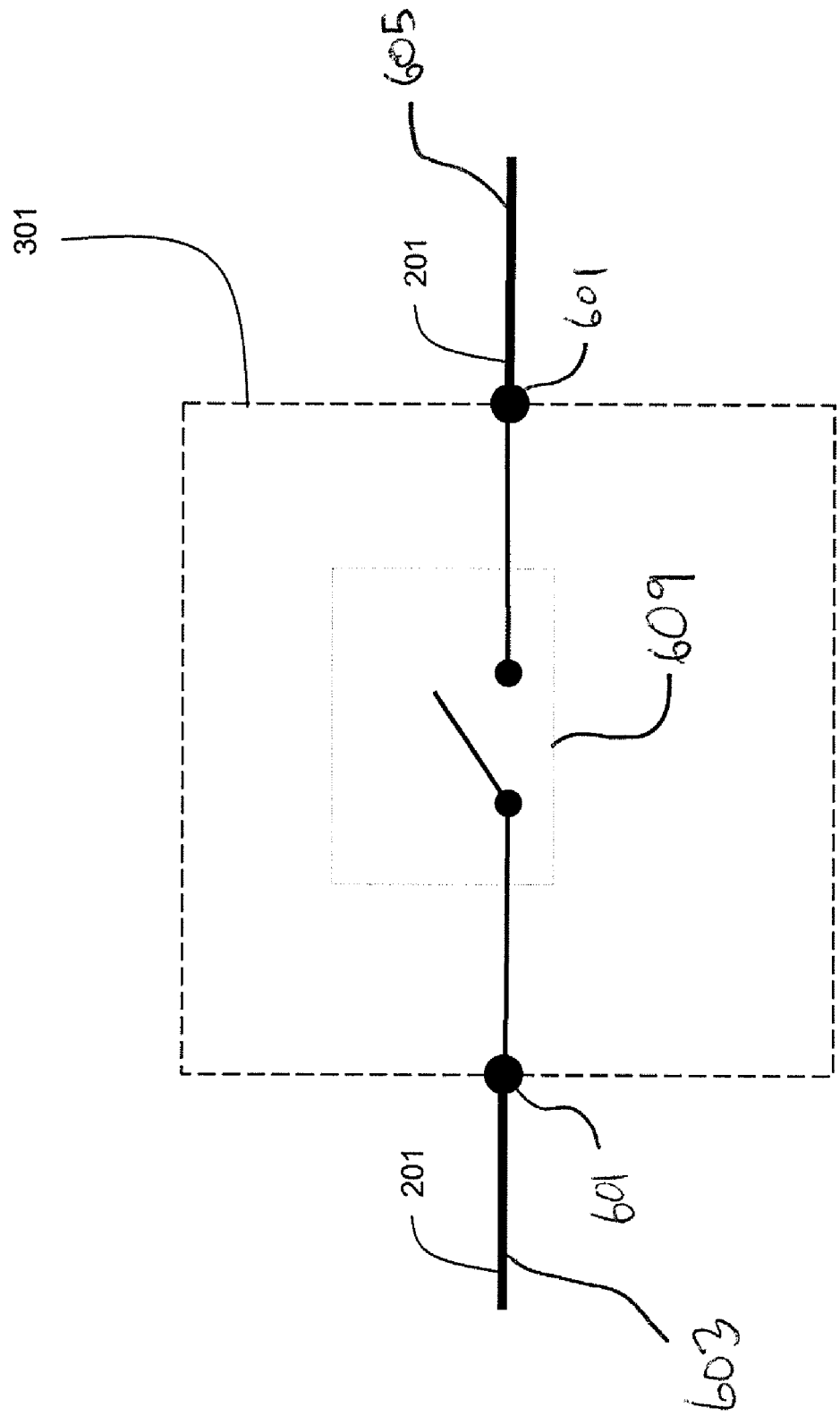

FIG. 8 illustrates a two-way universal connector shunt switch 301 according to an embodiment of the present invention. As discussed above with respect to FIG. 5, conductors 201 forming grid 500 connect to shunt switch 301 at junctions 601. The shunt switch 301 having the connector functionality shown in FIG. 8 includes a switch 609. The switch 609 in this embodiment is a manual, multi-pole single throw switch that is operable to open or close the circuit between first conductor 603 and second conductor 605. The operation of the switch 609 may take place using any manual switching mechanism. For example, a user operated switch, may be provided to open or close switch 609. In addition, additional wiring and/or circuitry may also be included to consolidate switching across a plurality of shunt switches 301 and/or automated control of the switching, either in response to a user input or in response to a sensed condition. Although FIG. 8 is shown as connecting a first conductor 603 to a second conductor 605, switch 609 may be configured in any arrangement that provides functionality to grid 500, wherein the configuration may include switching between and/or among more than two conductors 201.

Figure 9:
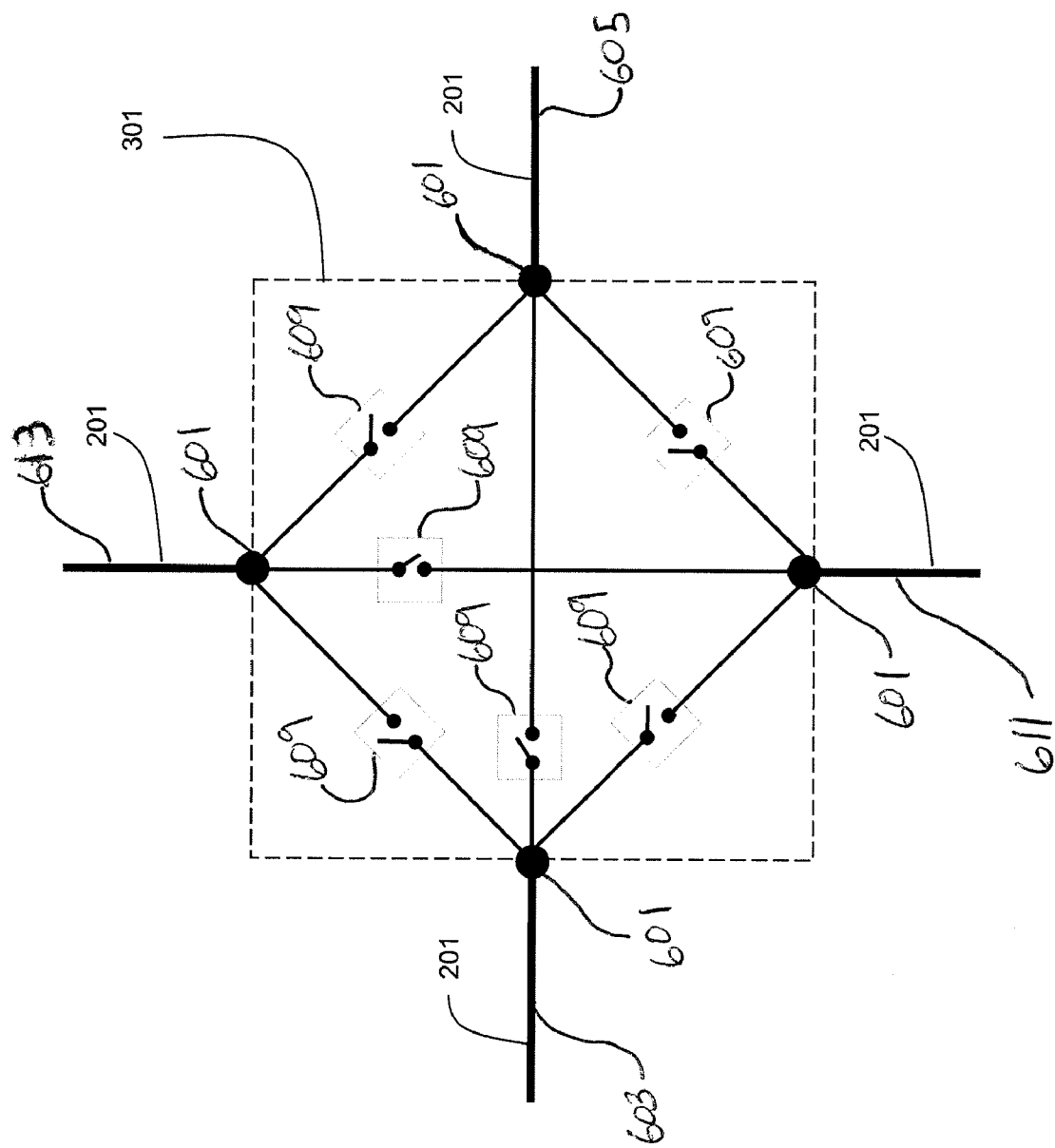

FIG. 9 illustrates a four-way universal connector shunt switch 301 according to an embodiment of the present invention. As discussed above with respect to FIG. 5, conductors 201 forming grid 500 connect to shunt switch 301 at junctions 601. Unlike FIGS. 6-8, this embodiment of the invention includes four junctions 601, allowing selective connection to conductors 201 in any of the four directions. The shunt switch 301 having the connector functionality shown in FIG. 8 includes a plurality of switches 609 configured to selectively permit flow of power from first conductor 603 to one or more of second conductor 605, third conductor 611, and fourth conductor 613. As shown, the switches 609 in this embodiment are manual, multi-pole single throw switches that are operable to open or close the circuit between any combination of junctions 601. As in FIG. 8, the operation of the switches 609 may take place using any manual switching mechanism or with any additional circuitry.

Figure 10:
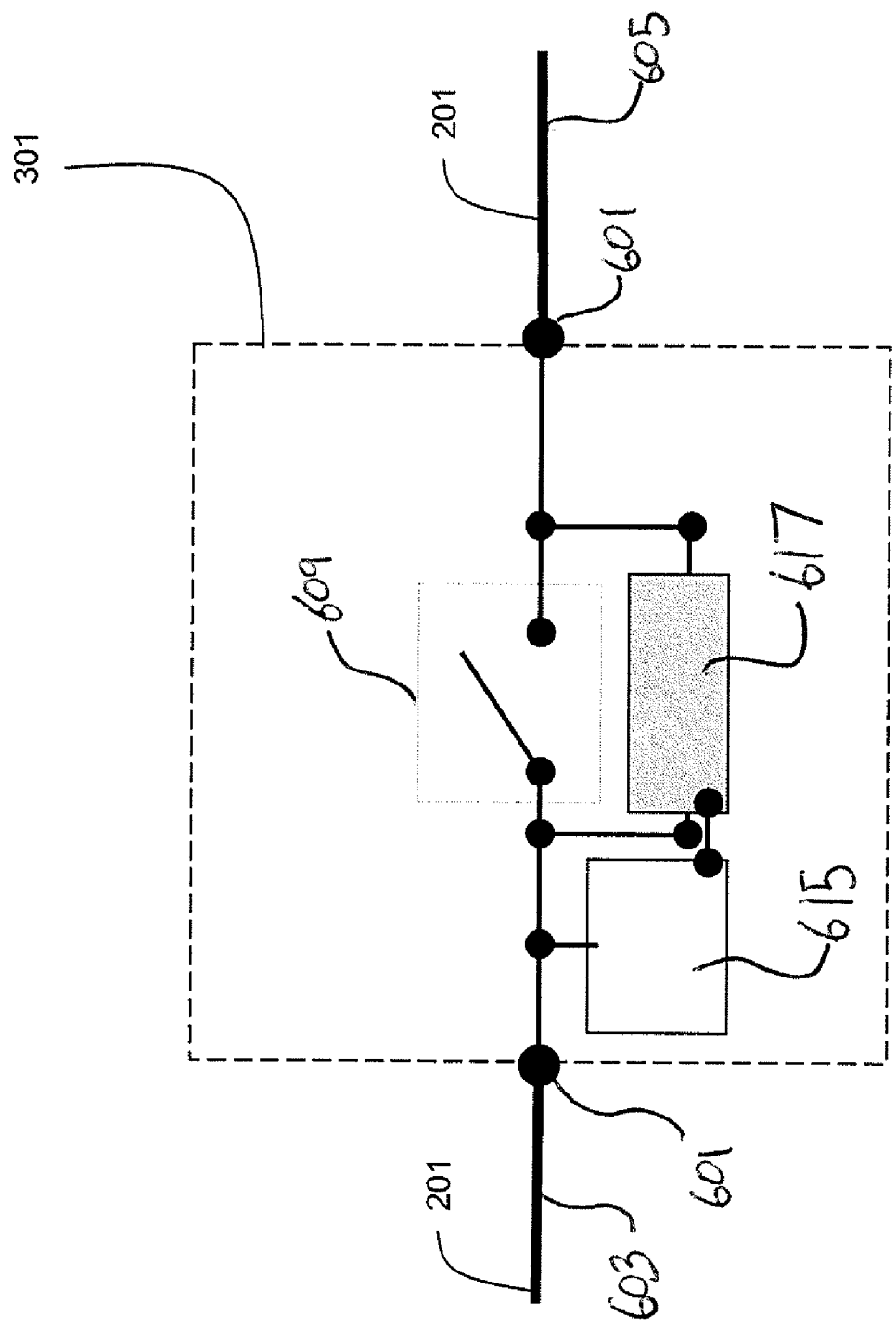

FIG. 10 illustrates a "dumb" shunt switch 301 according to an embodiment of the present invention. As discussed above with respect to FIG. 5, conductors 201 forming grid 500 connect to shunt switch 301 at junctions 601. The shunt switch 301 having the connection functionality shown in FIG. 10 includes a switch 609, a processor 615 and a relay 617. The switch 609 in this embodiment is a multi-pole single throw switch 609 that is operable to open or close the circuit between first conductor 603 and second conductor 605. Operation of switch 609 may be manual or by a remote control device that is controlled automatically or by user input. Relay 617 is preferably a solid state or electromechanical relay 617. The relay 617 is in communication with processor 615, which senses a condition on first conductor 603 and provides relay 617 with a signal that selectively operates relay 617 to open or close the circuit between first conductor 603 and second conductor 605. The relay 617 and processor 615 may be separate components or may be a unitary component. Although FIG. 10 is shown as connecting a first conductor 603 to a second conductor 605, switch 609 and relay 617 may be configured in any arrangement that provides functionality to grid 500, wherein the configuration may include switching between and/or among more than two conductors 201. In another embodiment of the invention, switch 609 may be omitted and relay 617 may provide the connecting functionality, wherein the relay 617 and processor 615 provide selective electrical connections between the first conductor 603 and the second conductor 605.

Figure 11:
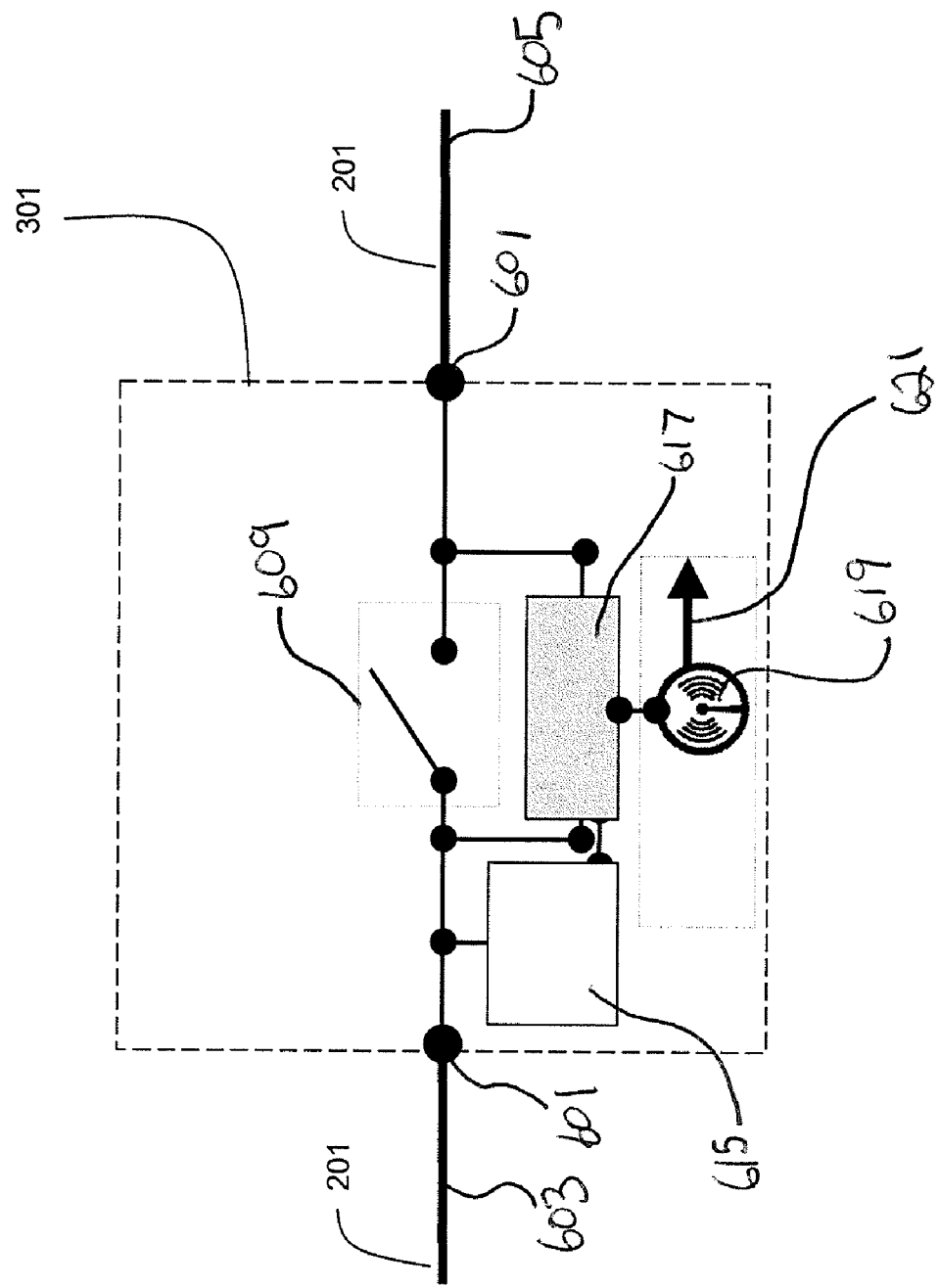

FIG. 11 illustrates a wireless signal "dumb" reporter shunt switch 301, according to an embodiment of the present invention. As discussed above with respect to FIG. 5, conductors 201 forming grid 500 connect to shunt switch 301 at junctions 601. The shunt switch 301 of FIG. 11 includes the arrangement of switch 609, a processor 615 and a relay 617 shown and described with respect to FIG. 10. In addition, the embodiment shown in FIG. 11 includes a signal device 619, which is capable of transmitting a signal 621. The signal 621 produced is preferably a wireless electromagnetic signal, such as radio frequency (RF) waves. The signal device 619 may be any signal producing device that transmits a signal 621, such as an RF transmitter. The signal device 619 is in communication with the relay 617, which provides signals 621 corresponding to conditions, such as voltages, currents, processor output signals, switch positions or any other condition that is desirable to a controller of the grid 500. The signals 621 may be received by a controller or other device (not shown), capable of analyzing the information contained in signal 621. For example, a controller may determine, based on signals 621 received, to provide an output or response that configures the opening or closing of relay 617 in a manner that results in inclusion of additional power sources into the circuit, adjustment of current or voltage to the grid 500 or any other output or response that is desirable for functionality of grid 500.

Figure 12:
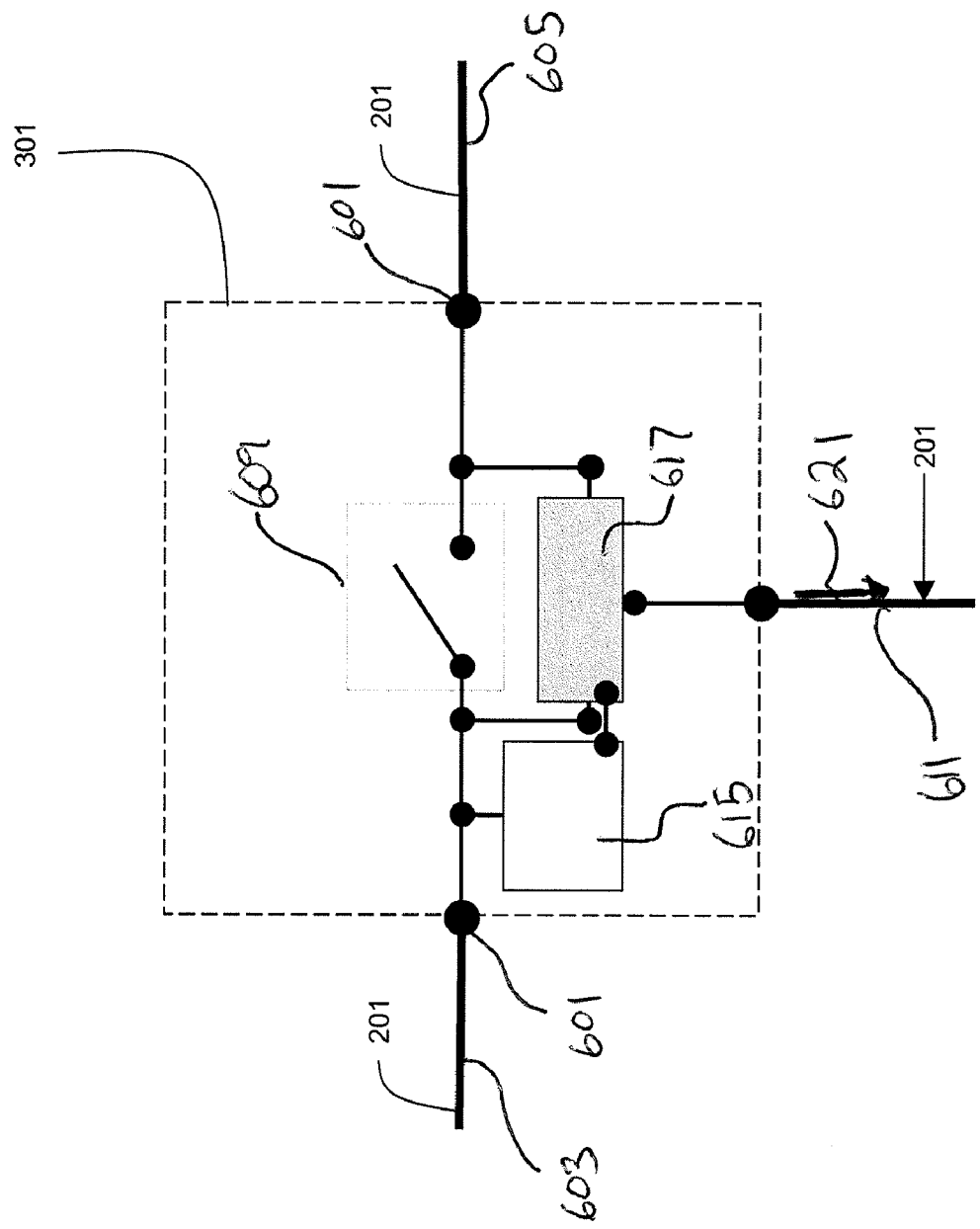

FIG. 12 illustrates a wired signal version of the "dumb" reporter shunt switch 301, according to an embodiment of the present invention. As discussed above with respect to FIG. 5, conductors 201 forming grid 500 connect to shunt switch 301 at junctions 601. The shunt switch 301 of FIG. 12 includes the arrangement of switch 609, a processor 615 and a relay 617 shown and described with respect to FIG. 10. In addition, the embodiment shown in FIG. 12 includes a third conductor 611, which transmits signal 621 via a wired connection. The signal 621 may be utilized in substantially the same manner as described above with respect to FIG. 11, wherein the signal 621 is received by a wired connection via third conductor 611. For example, the signal 621 may provide a voltage to an LED, which illuminates to show that the relay 617 is open or closed.

Figure 13:
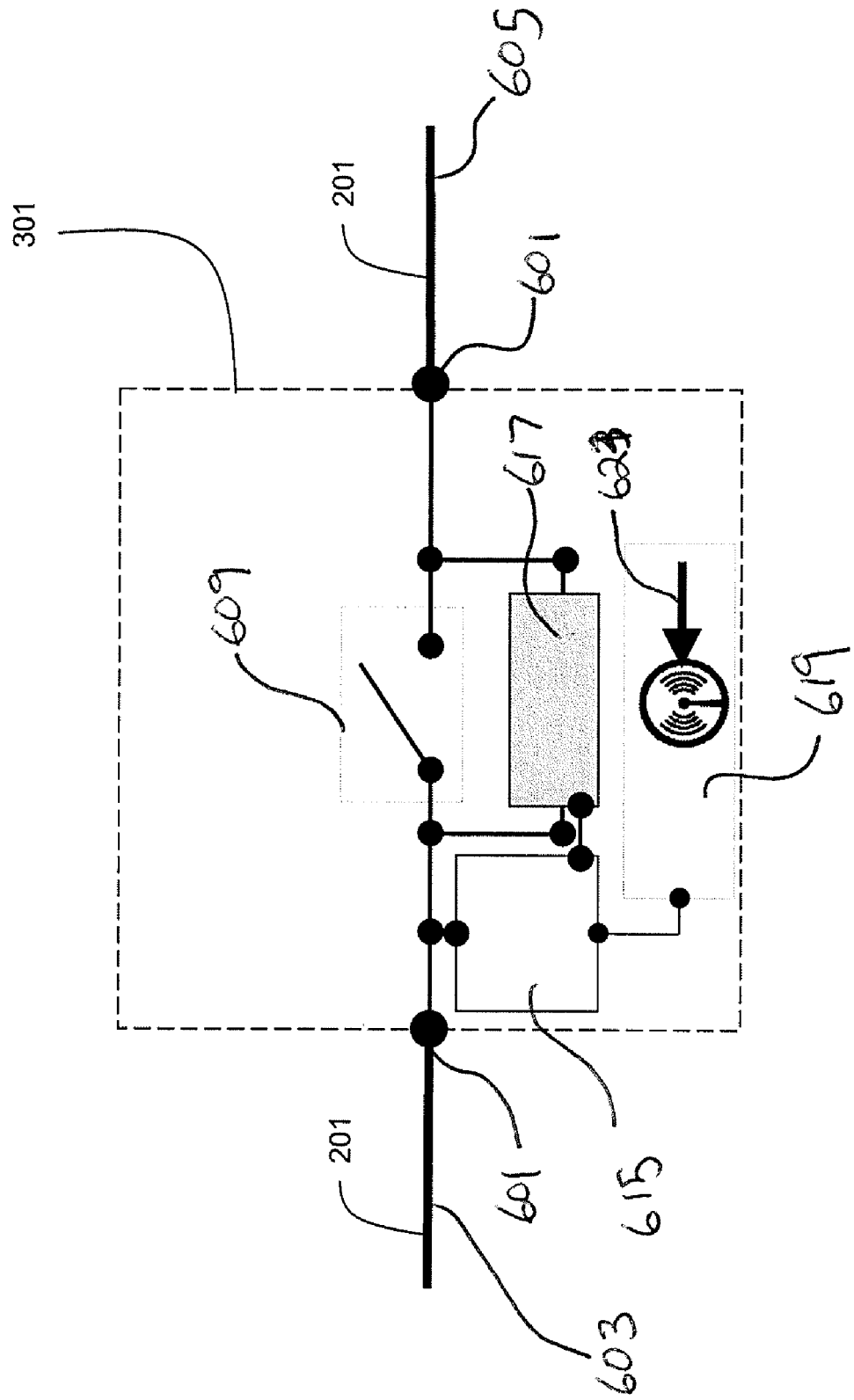

FIG. 13 illustrates a wireless signal "smart" shunt switch 301, according to an embodiment of the present invention. As discussed above with respect to FIG. 5, conductors 201 forming grid 500 connect to shunt switch 301 at junctions 601. The shunt switch 301 of FIG. 13 includes the arrangement of switch 609, a processor 615 and a relay 617 shown and described with respect to FIG. 10. In addition, the embodiment shown in FIG. 13 includes a signal device 619, which receives signal 623. The signal 623 received is preferably a wireless electromagnetic signal, such as RF waves. The signal device 619 may be any signal receiving device that provides a signal 621, such as an RF antenna. The signal device 619 is in communication with the processor 615, which receives signals corresponding to settings of the processor desirable to a controller of the grid 500. For example, signals 623 received by the signal device 619, are preferably from a remote RF transmitter or similar device, operated by a user or automatically, based on sensed conditions or desired functionality of grid 500. The signal 623 may instruct the processor 615 to open or close the relay 617 in correspondence to an inputted voltage or current.

Figure 14:
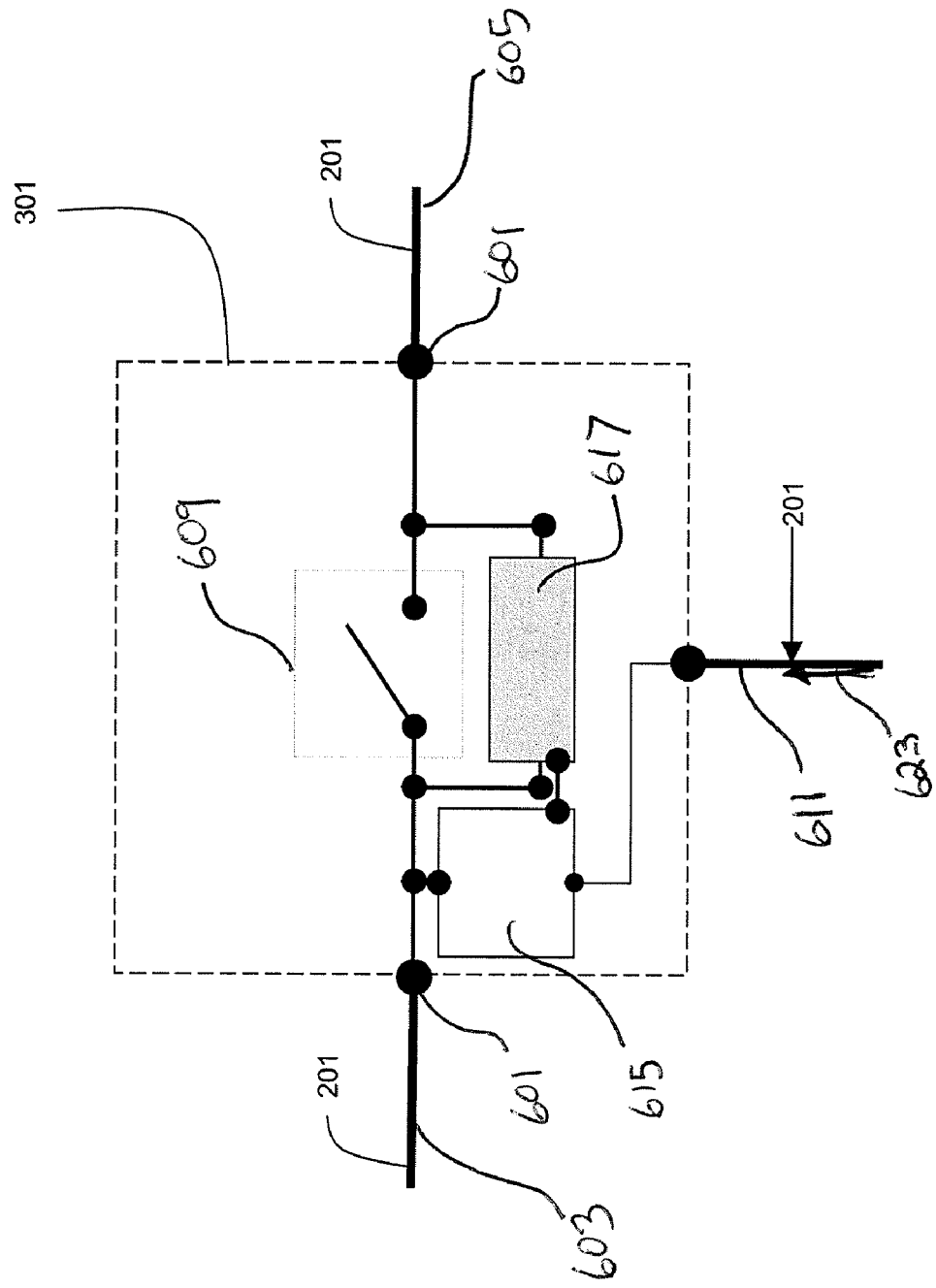

FIG. 14 illustrates a wired signal "smart" shunt switch 301, according to an embodiment of the present invention. As discussed above with respect to FIG. 5, conductors 201 forming grid 500 connect to shunt switch 301 at junctions 601. The shunt switch 301 of FIG. 14 includes the arrangement of switch 609, a processor 615 and a relay 617 shown and described with respect to FIG. 10. In addition, the embodiment shown in FIG. 14 includes a third conductor 611, which transmits signal 623 via a wired connection to processor 615. The signal 623 may be utilized in substantially the same manner as described above with respect to FIG. 13, wherein the signal 623 is received by a processor 615 via third conductor 611. For example, a signal from a controller via third conductor 611 may configure processor 615 to instruct the relay 617 to open or close in response to a predetermined current on first conductor 603.

Figure 15:
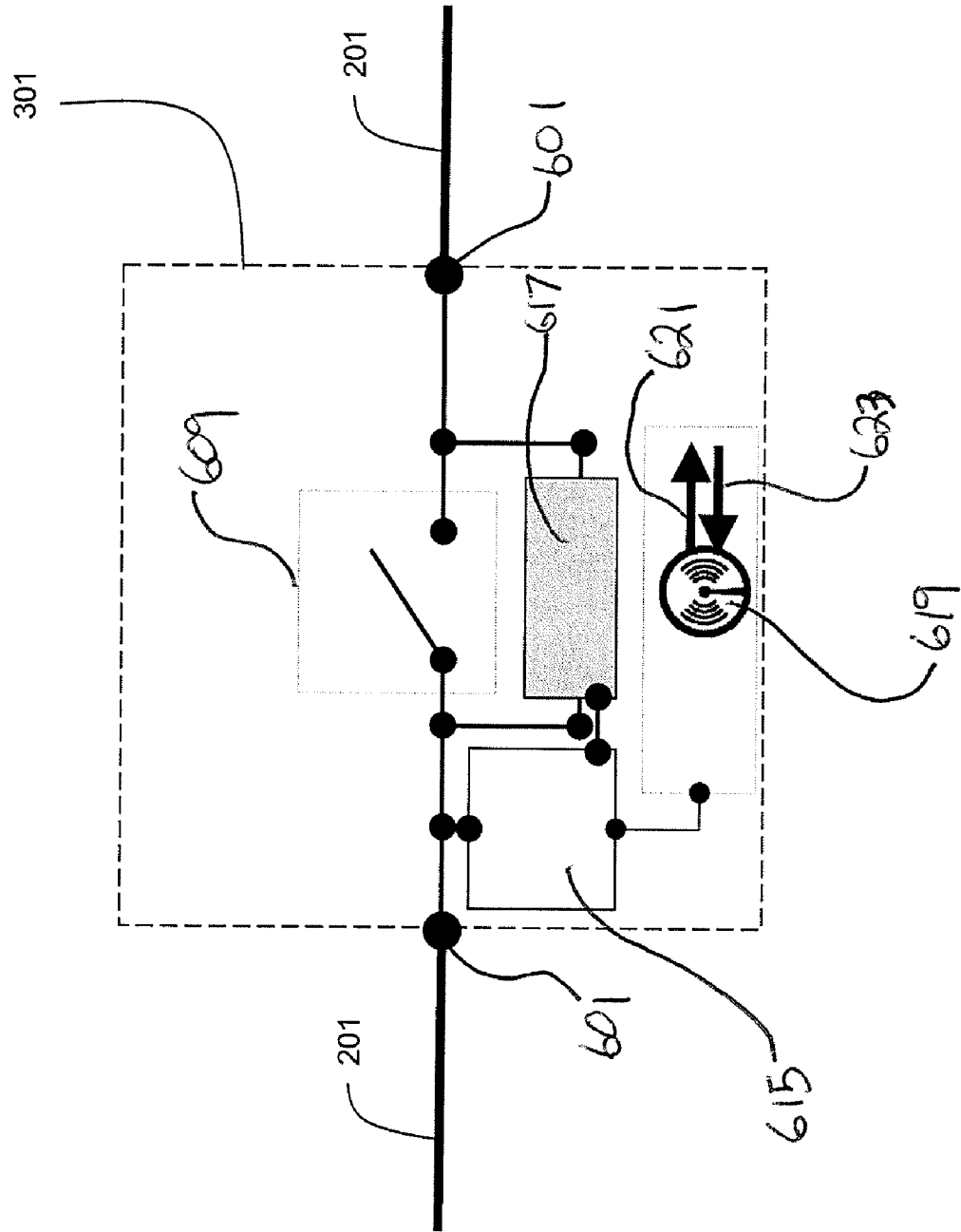

FIG. 15 illustrates a wireless "smart" reporter shunt switch 301, according to an embodiment of the present invention. As discussed above with respect to FIG. 5, conductors 201 forming grid 500 connect to shunt switch 301 at junctions 601. The shunt switch 301 of FIG. 15 includes the arrangement of switch 609, a processor 615 and a relay 617 shown and described with respect to FIG. 10. In addition, the embodiment shown in FIG. 15 includes a signal device 619, which receives signal 623 and transmits signal 621. The signal 621 may be utilized in substantially the same manner as described above with respect to FIG. 11, wherein the signal 621 is received by processor 615. The signal 623 may be utilized in substantially the same manner as described above with respect to FIG. 13, wherein the signal 623 is received by processor 615. The use of transmitting and receiving signals 621 and 623 may allow, for example, a controller or other device to communicate and remotely control the function of the shunt switch 301.

Figure 16:
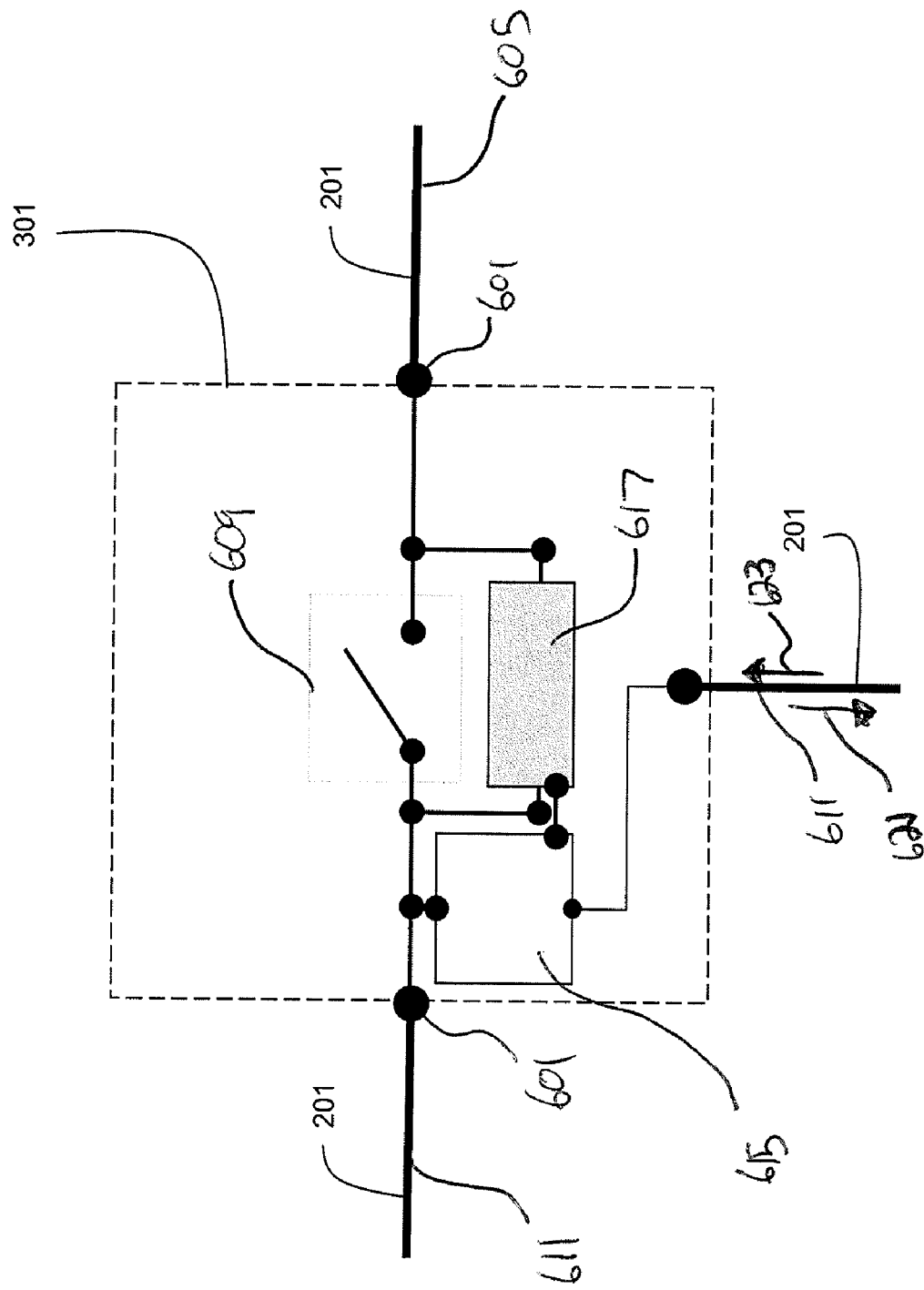

FIG. 16 illustrates a wired "smart" reporter shunt switch 301, according to an embodiment of the present invention. As discussed above with respect to FIG. 5, conductors 201 forming grid 500 connect to shunt switch 301 at junctions 601. The shunt switch 301 of FIG. 16 includes the arrangement of switch 609, a processor 615 and a relay 617 shown and described with respect to FIG. 10. In addition, the embodiment shown in FIG. 16 includes a third conductor 611, which receives signal 623 and transmits signal 621. Third conductor 611 is in communication with processor 615. The signals 621 and 623 provide substantially the same functionality described in FIG. 15, wherein the signals 621 and 623 are provided by a wired connection of third conductor 611.

Figure 17:
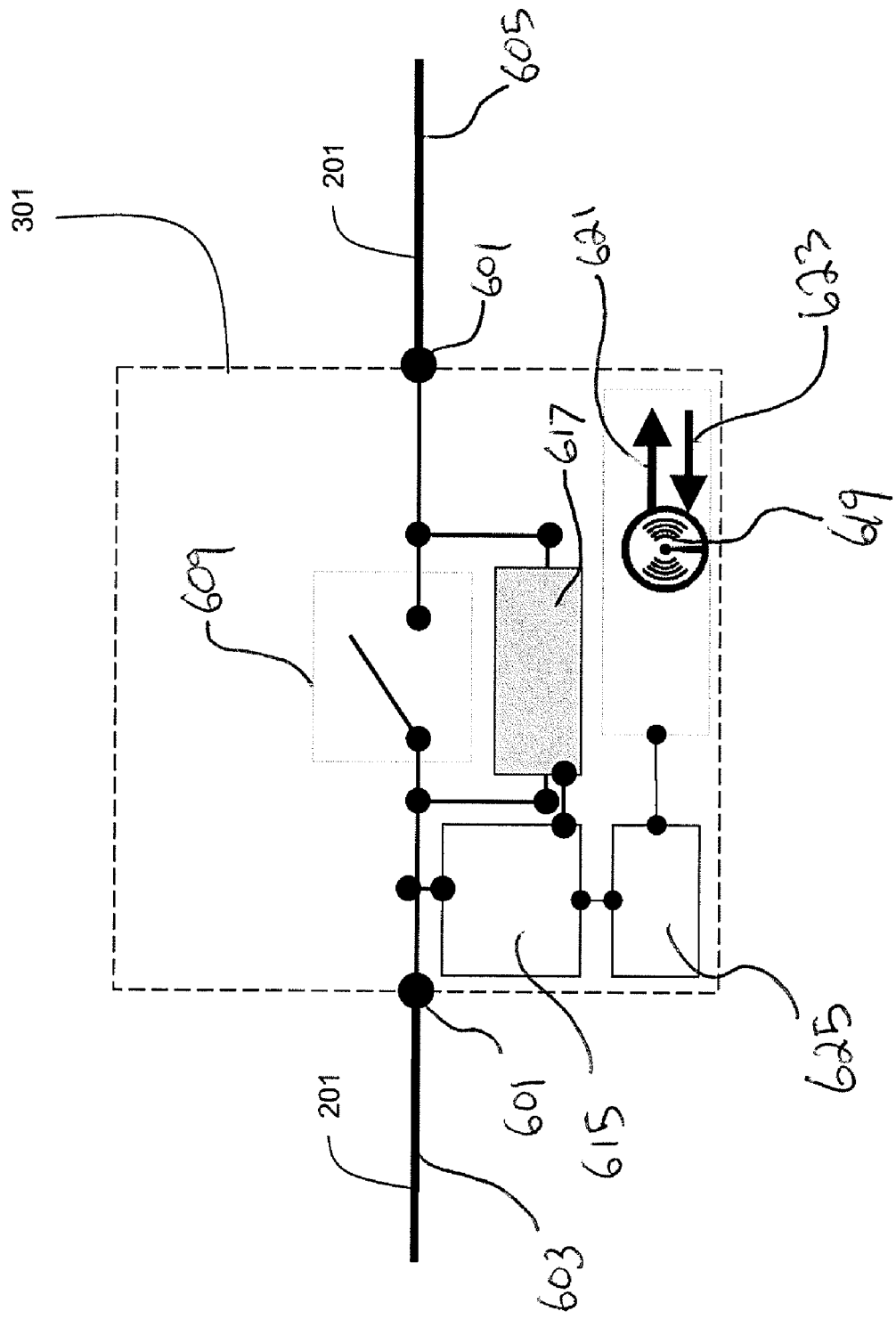

FIG. 17 illustrates a wireless "intelligent" reporter shunt switch 301, according to an embodiment of the present invention. As discussed above with respect to FIG. 5, conductors 201 forming grid 500 connect to shunt switch 301 at junctions 601. The shunt switch 301 of FIG. 17 includes the arrangement of switch 609, a processor 615, a relay 617, and signal device 619 shown and described with respect to FIG. 15. However, the signal device 619 of this embodiment is in communication with a logic circuit 625, which receives signals 623 corresponding to settings of the processor 615 desirable to a controller of the grid 500. Logic circuit 625 is circuitry, preferably including a microprocessor, or similar circuitry that is in communication with the processor 615 and provides selective signals to processor 615, corresponding to a predetermined input value. For example, the logic circuit 625 may include settings corresponding to administration and/or permissions for particular users to receive signals 621 from processor 615 and/or send signal 623 to processor 615. In another example, the logic circuit 625 may be included with settings that correspond to addresses for junctions 601, wherein a central controller may utilize signals 623 to control a plurality of shunt switches 301.

Figure 18:
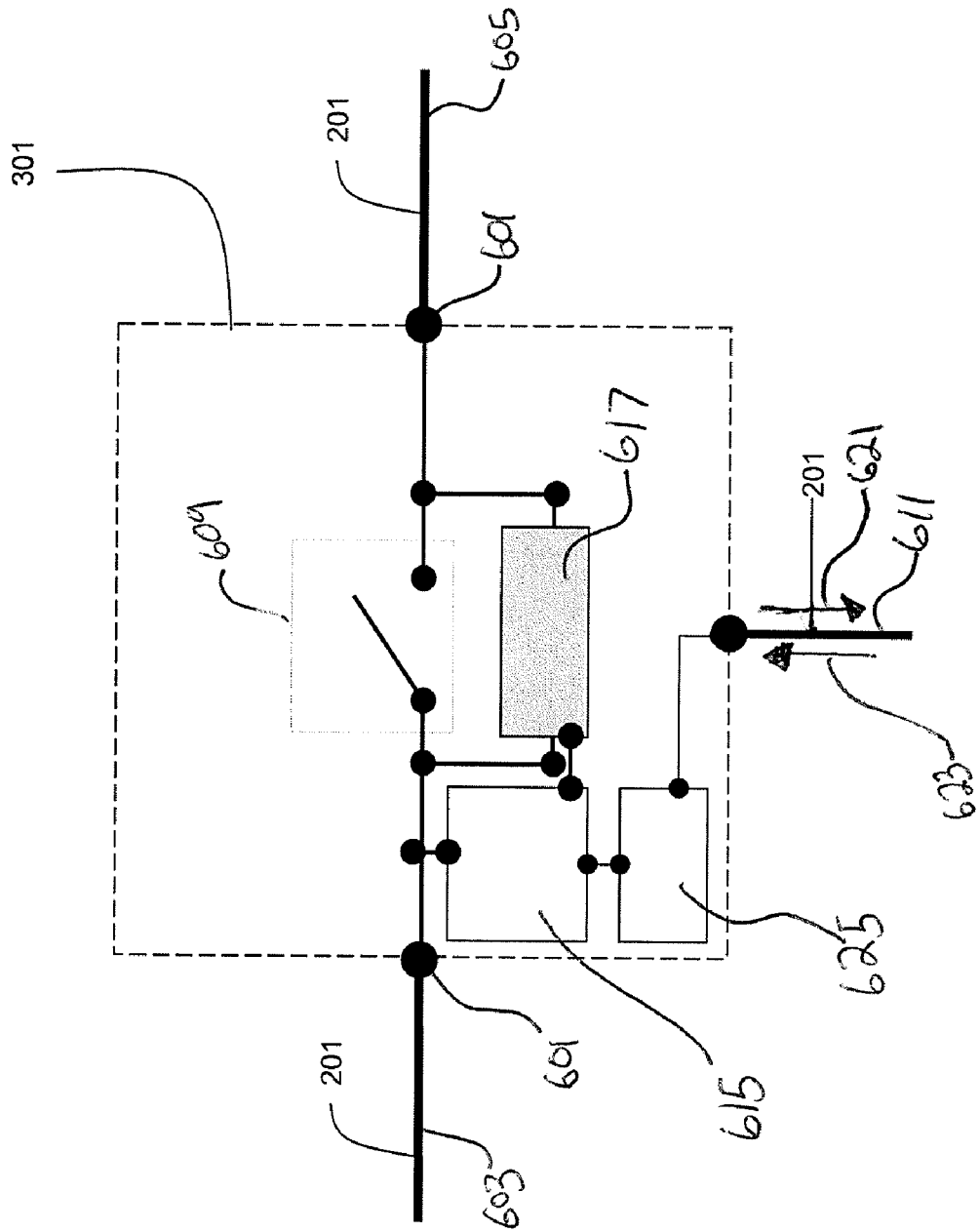

FIG. 18 illustrates a wired "intelligent" reporter shunt switch 301, according to an embodiment of the present invention. As discussed above with respect to FIG. 5, conductors 201 forming grid 500 connect to shunt switch 301 at junctions 601. The shunt switch 301 of FIG. 18 includes the arrangement of switch 609, a processor 615, a relay 617, and third conductor 611 shown and described with respect to FIG. 16. In addition, the embodiment shown in FIG. 18 includes logic circuit 625, which receives signal 623 and transmits signal 621. The signals 621 and 623 provide substantially the same functionality described in FIG. 17, wherein the signals 621 and 623 are provided to logic circuit 625 by a wired connection of third conductor 611.

Shunt switches 301 for use with the present invention are not limited to the configurations shown in FIGS. 6-18 and may include any combination of hardware including, but not limited to, microprocessors, diodes, transistors, rectifiers, resistors, thermistors, capacitors, analog and/or digital logic circuits, sensing circuits, addressable ID circuits, jumpers, insulators, solid state or electromechanical relays, connectors and/or contacts, and/or any other electrical or electronic circuitry and components that provide connections between conductors and provide grid 500 with the desired functionality. In addition, the shunt switches 301 are not limited to connection between two conductors 201 and may include connections between three or more conductors 201. For example, in a grid 500 having functionality in both perpendicular directions of the support members 203, or if multiple systems are selectively connectable, connections between three or more conductors 201 may be desirable.

Figure 19:
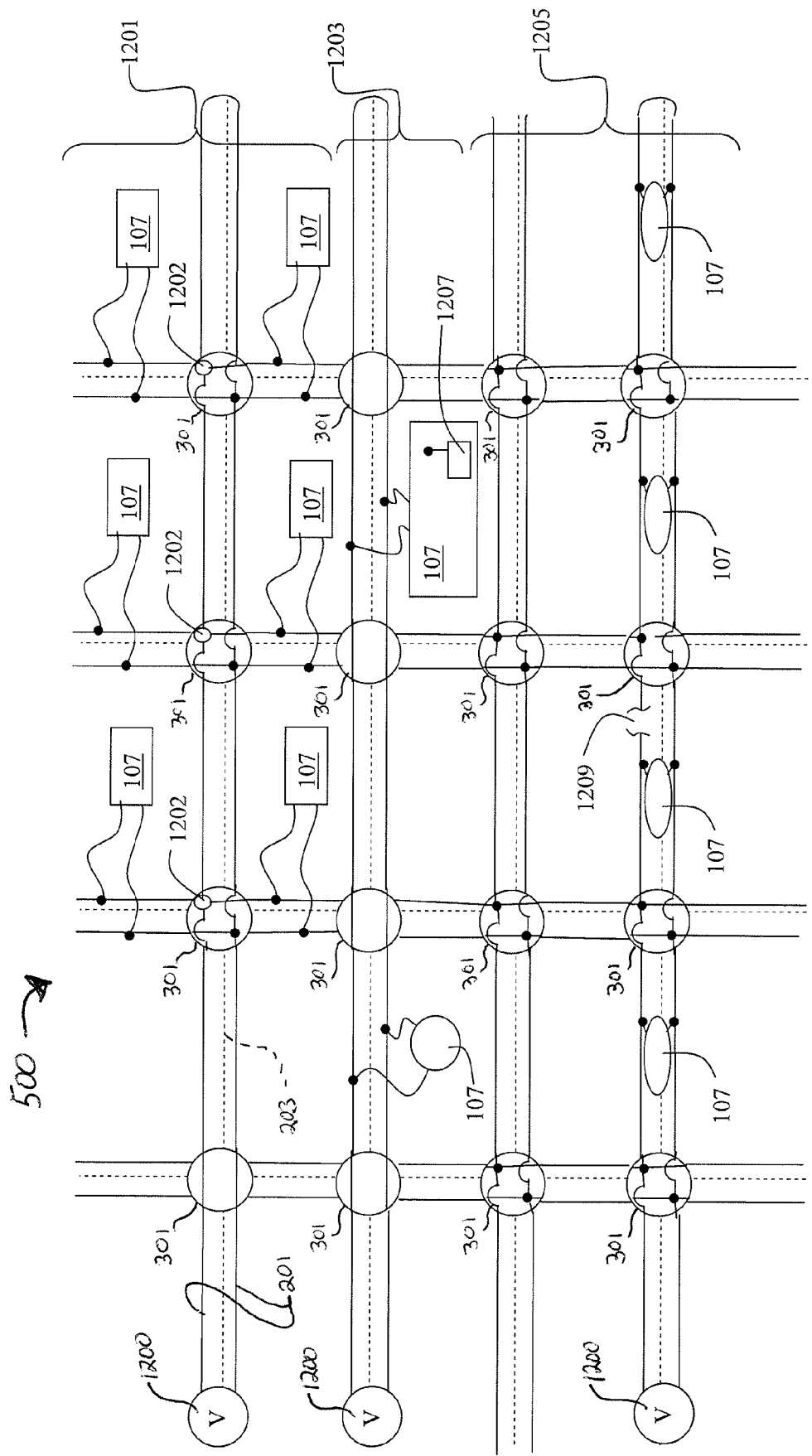
FIG. 19 shows a schematic view of an electrified ceiling system according to another embodiment of the invention.

FIG. 19 depicts a representative sample of possible configurations of the grid 500 according to the present invention. The invention is not limited to a specific physical or functional device, material, or design. FIG. 19 is merely illustrative of a systemic concept of design and operation of a reconfigurable mesh used in building interior applications. Other similarly compatible but more or less complex functionalities are possible and include, but are not limited to, auto sensing, measuring, switching, regulating, reporting, computing, and electromechanical and/or micro-electronic/photonic positioning or actuation.

Grid 500 includes a first circuit arrangement 1201 having a plurality of electrical devices 107 configured on opposite sides of a set of shunt switches 301. The first circuit arrangement 1201 includes relays 1202 that selectively connect either or both the perpendicular conductors 201 connecting to electrical devices 107 and a voltage source 1200. The relays 1202 may include voltage or current sensing components that open or close circuits based upon pre-set or programmed settings, wherein the configuration of relays provides a desired functionality. For example, the shunt switches 301 may be selectively connected to provide different configurations of electrical devices 107 that are activated based on a predetermined voltage or current.

Grid 500 further includes second circuit arrangement 1203, having a voltage source 1200 and an electrical device 107, which further includes two electrical devices 107, wherein the electrical devices may further include a wireless transmitter 1207 that permits activation or deactivation of the electrical device 107. For example, a manual switch or similar device may transmit a signal to the wireless transmitter 1207 and instruct the electrical device 107 to activate or deactivate.

Grid 500 further includes a third circuit arrangement 1205, having a voltage source 1200 and a plurality of electrical devices 107. In addition, the third circuit arrangement 1205 includes a discontinuity 1209 in the conductor 201. Discontinuities 1209 may be a result of, but are not limited to, bad electrical connections, damage to the conductor 201, or excessive corrosion of the conductor 201. The configuration of shunt switches 301 in the third circuit arrangement 1205 permit the power to flow in an alternate path (e.g., the path shown in the adjacent set of conductors 201 and shunt switches 301) bypassing the discontinuity 1209. This configuration permits the grid 500 to include multiple paths to the electrical devices 107 to increase the reliability of the system. In addition, the shunt switches 301 may be configured as "smart" or "intelligent" shunt switches 301 wherein the path of the power may be adjusted in response to a discontinuity 1209 during operation of the grid 500.

Figure 20:
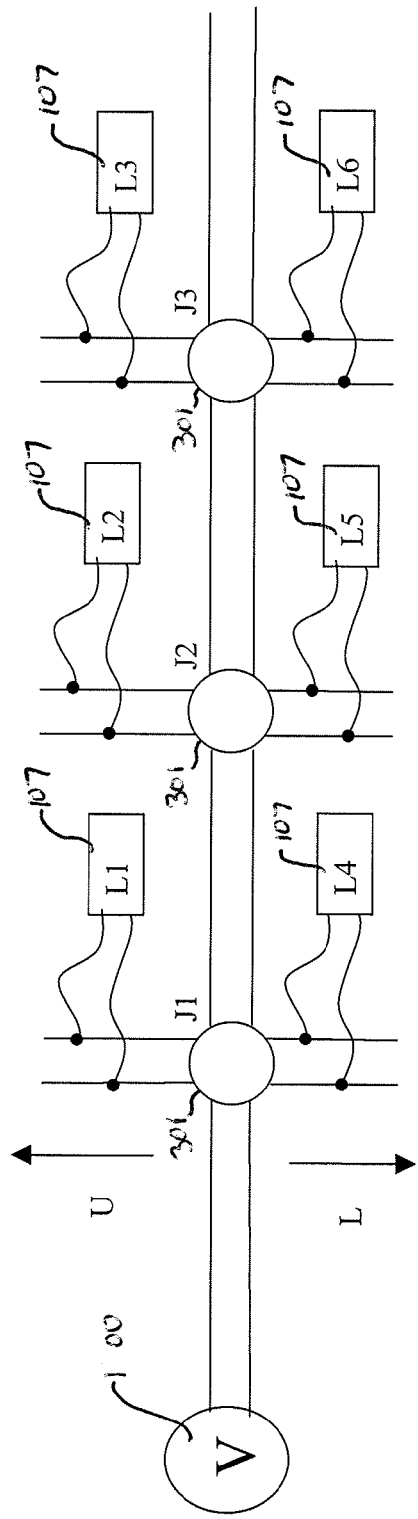
FIG. 20 schematically illustrates a selective lighting system according to an embodiment of the present invention.

FIG. 20 illustrates a system according to the present invention including a combination of shunt switches 301 that permit selective activation of a plurality of electrical devices 107 (i.e., L1, L2, L3, L4, L5 and L6). For example, the system illustrated in FIG. 20 may include the lighting of a section of a room space 101 (FIG. 2). As shown in FIG. 20, shunt switches J1, J2 and J3 are connected at the junctions of grid framework 105 (not shown in FIG. 20). The shunt switches 301 are configured to permit flow in one or both of the U-direction or the L-direction, as shown in FIG. 20. In this embodiment, the shunt switches 301 are configured to provide a flow in the U-direction at an input of X volts, in the L-direction at an input of Y volts and in the U-direction and the L-direction at the input of Z volts. Voltage source 1200 is variable to provide at least voltages X, Y and Z based upon the desired combination of electronic devices 107 desired. The variation of the voltages permits the selective activation of electrical devices 107 or sets of electrical devices 107 by merely variation of voltage. The same functionality may be provided by variations in current or signals provided remote sensors.

By using shunt switches 301 to electrically connect the conductive elements, the support member 203, having the conductors 201 disposed thereon or therein, may be further modified as a part of the pre-installation or site installation "fitting" process. It is contemplated that simple tools, that are the same or similar to those currently used for non-power grids, be used in this process. For this and other reasons, including those within or outside the scope of the power/signal functionality of the grid system, the system designer shall be free to inter-mix grid elements of a variety of lengths, regardless of whether or not they contain conductors 201.

As discussed above, the shunt switches 301 are placed within grid 500 in locations that provide desired functionality. Desired functionality may include, but is not limited to, control of the grid system power requirements, selective activation of electrical devices 107, default/emergency power conditions, or remote or central control of the above conditions in one or more grids 500. For example, in one embodiment of the present invention, the desired functionality may include a load shedding capability wherein the system maintains a desired electrical load of the system as electrical devices 107 are connected and/or disconnected to the proposed system. In this embodiment, the shunt switches 301 are either configured or remotely configured to monitor the conditions, such as voltages and currents of the conductors 201 to which the individual shunt switches 301 are configured. Based on the sensed conditions, the shunt switches 301 and/or the remote controller, provide an opening or closing of the relay 617 such that the system is configured to adjust for changes in electrical load. Such adjustments may include closing the circuits in a manner that includes additional power sources, opens circuits in a manner that excludes power sources, or opens, closes or isolates circuits to load creating electrical devices 107. Such capability would allow the grid 500 to pro-actively or reactively modify, either temporarily or permanently, the connected loads. Such interactive capability allows the system to accommodate changes in load for maximum efficiency, to comply with local code or ordinance or to appropriately respond to emergency power conditions, such as external supply outages and local supply problems.

The description of the example embodiments of the present invention is given above for the understanding of the present invention. It will be understood that the invention is not limited to the particular embodiments described herein, but is capable of various modifications, rearrangements and substitutions which will now become apparent to those skilled in the art without departing from the scope of the invention.

The invention claimed is:

1. A power and signal distribution system for a building interior comprising:
a plurality of support members forming a grid framework wherein two or more of the support members have an electrical conductor disposed thereon; the two or more support members being positioned relative one another in more than one direction and contacting one another at a junction; the electrical conductors disposed on the two or more support members being connected to a shunt switch at the junction, the shunt switch providing electrical communication between the electrical conductors whereby a multidirectional conductive path is formed; and
the shunt switch being configurable to actively route the flow of electricity along the multidirectional conductive path.

2. The system of claim 1, wherein the at least one shunt switch provides a signal in response to a condition.

3. The system of claim 2, wherein the signal provided is a wireless signal.

4. The system of claim 2, wherein the signal provided is a wired signal.

5. The system of claim 2, further comprising a controller that receives the signal and provides an output in response to the signal.

6. The system of claim 1, wherein the at least one shunt switch is configurable in response to a signal received.

7. The system of claim 6, wherein the signal received is a wireless signal.

8. The system of claim 6, wherein the signal received is a wired signal.

9. The system of claim 6, further comprising a controller in communication with the at least one shunt switch, wherein the controller provides the signal.

10. The system of claim 1, wherein the conductors are disposed on a surface of the support members.

11. The system of claim 1, wherein the at least one shunt switch is addressable.

12. The system of claim 11, wherein the addressable shunt switch is configured in response to a signal from a controller, wherein the signal corresponds to a desired functionality of the system.

13. The system of claim 1, wherein the grid framework is a ceiling framework for a suspended ceiling.

14. A method of configuring a power and signaling system, the method comprising the steps of:
 (a) mounting conductive elements to a plurality of support members;
 (b) mechanically connecting the plurality of support members at a junction and positioning the support members at multiple angles relative to one another, the conductive elements remaining electrically isolated from one another;
 (c) providing electrical communication between at least two of the conductive elements mounted on the support members via a shunt switch thereby forming a multidirectional conductive path;
 (d) applying electricity to one of the conductive elements forming the multidirectional conductive path, the electricity flowing in a first direction toward a shunt switch; and
 (e) rerouting the flow of electricity in a second direction via the shunt switch to a point of use.

15. The method of claim 14, wherein after step (d) transmitting a signal to the at least one shunt switch, the at least one shunt switch configuring itself in response to the signal.

16. The method of claim 15, wherein a controller provides the signal to the shunt switch.

17. The method of claim 16, wherein the controller receives a signal from the shunt switch, the controller providing a second signal in response to the signal received from the shunt switch.

* * * * *